(12) United States Patent　(10) Patent No.: US 8,878,451 B2
Lee et al.　(45) Date of Patent: Nov. 4, 2014

(54) LIGHTING SYSTEM AND METHOD FOR CONTROLLING THE SAME

(75) Inventors: Kwanghyun Lee, Seoul (KR); Junwan Bang, Seoul (KR); Geunchang Do, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 13/479,561

(22) Filed: May 24, 2012

(65) Prior Publication Data

US 2012/0299509 A1　Nov. 29, 2012

(30) Foreign Application Priority Data

May 25, 2011　(KR) ......................... 10-2011-0049591

(51) Int. Cl.
*H05B 37/02*　(2006.01)
*H04L 29/12*　(2006.01)
*H04L 12/24*　(2006.01)

(52) U.S. Cl.
CPC ........ *H04L 41/0806* (2013.01); *H04L 61/6081* (2013.01); *H05B 37/0272* (2013.01); *H04L 61/2038* (2013.01); *H04L 41/0879* (2013.01); *H04L 41/22* (2013.01)
USPC .......................................... 315/291; 315/362

(58) Field of Classification Search
None
See application file for complete search history.

(56) References Cited

U.S. PATENT DOCUMENTS

| | | | |
|---|---|---|---|
| 5,835,790 A * | 11/1998 | Nagai et al. | ...................... 710/61 |
| 7,307,542 B1 | 12/2007 | Chandler et al. | |
| 2006/0154642 A1 * | 7/2006 | Scannell, Jr. | ............... 455/404.1 |
| 2007/0268866 A1 | 11/2007 | Choi | |
| 2010/0029268 A1 | 2/2010 | Myer et al. | |
| 2012/0098445 A1 * | 4/2012 | Park et al. | ...................... 315/193 |
| 2012/0098446 A1 * | 4/2012 | Kim et al. | ...................... 315/193 |
| 2012/0306378 A1 * | 12/2012 | Oh et al. | ........................ 315/151 |

FOREIGN PATENT DOCUMENTS

| | | |
|---|---|---|
| KR | 10-2009-007964 A | 1/2009 |
| KR | 10-2010-0094692 A | 8/2010 |
| KR | 10-2011-0048257 A | 5/2011 |
| KR | 10-2011-0048816 A | 5/2011 |
| WO | WO 2010/023619 A1 | 3/2010 |

OTHER PUBLICATIONS

Korean Notice of Allowance dated Nov. 30, 2011.
PCT International Search Report dated Jul. 30, 2012.
German Office Action dated Feb. 3, 2014, issued in Application No. 11 2011 105 273.1 (with English translation).

* cited by examiner

*Primary Examiner* — Crystal L Hammond
(74) *Attorney, Agent, or Firm* — KED & Associates, LLP

(57) ABSTRACT

A lighting system as disclosed herein may include a lighting device, a switch to control the lighting device, and a controller to assign an address to the lighting device and the switch. The controller may be connected to the lighting device and the switch over a ZigBee network. The lighting device and the switch may have a first address and a first network identifier. The lighting device or the switch transmits a request for address assignment to the controller based on the first address, the request including the first network identifier, and the controller compares the first network identifier to a second network identifier stored at the controller, and may assign a second address based on the request if the first network identifier is the same as the second network identifier.

20 Claims, 23 Drawing Sheets

LIGHTING SYSTEM AND METHOD FOR CONTROLLING THE SAME

CROSS-REFERENCE TO RELATED APPLICATION(S)

This application claims priority under 35 U.S.C. §119 to Korean Application No. 10-2011-0049591, filed in Korea on May 25, 2011, whose entire disclosure is hereby incorporated by reference.

BACKGROUND

1. Field

The present disclosure relates to a lighting system and method for controlling the same. The lighting system and methods as disclosed improve the operation of lighting to allow a more efficient utilization and conservation of energy resources.

2. Background

Lighting systems and methods for controlling the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
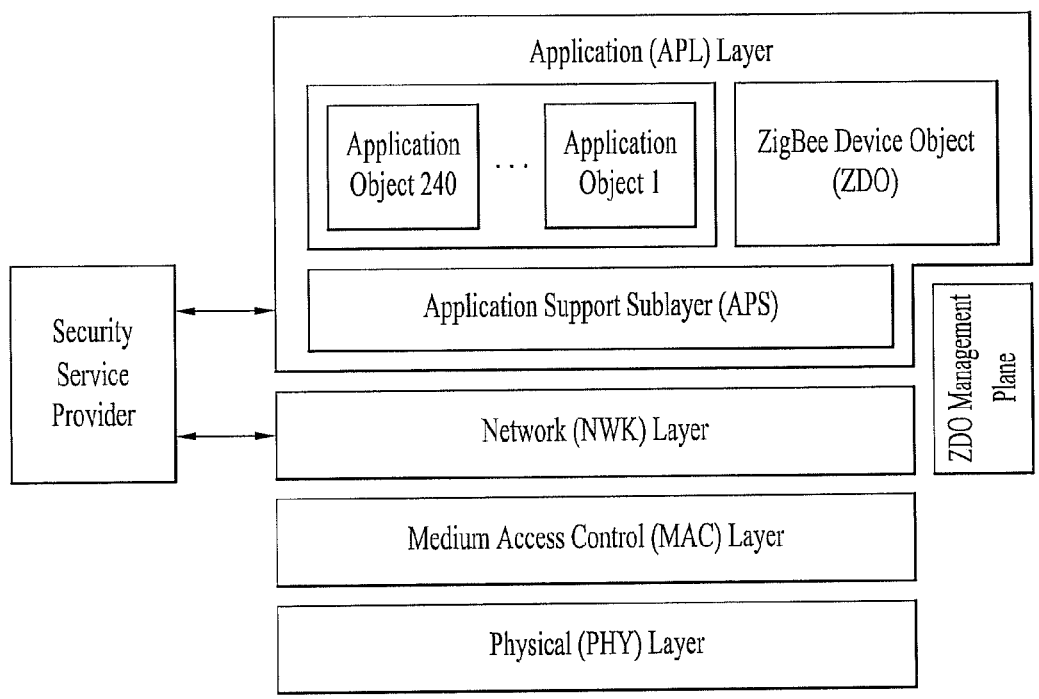
FIG. 1 is a diagram illustrating a stack architecture according to an embodiment of the present disclosure.

In general, incandescent lamps, discharge lamps, and fluorescent lamps are used most commonly as light sources for various purposes, such as domestic, landscape, industrial, or other appropriate types of lighting applications. These types of light sources suffer from various disadvantages such as poor efficiency and large amounts of heat generation (e.g., incandescent lamps), high price and high operational voltage (e.g., discharge lamps), and may be harmful to the environment due to their use of mercury (e.g., fluorescent lamps).

Light emitting diode (LED) based light sources may overcome the drawbacks of these light sources. LEDs have advantages in efficiency, flexibility to emit light in a variety of colors, autonomy of design, and so on. The LED is a semiconductor device which emits light when a forward voltage is applied thereto. LEDs have a greater lifespan, lower power consumption, and electric, optical, and physical characteristics which are suitable for mass production when compared to incandescent, discharge, or fluorescent types of light sources.

A controller may be provided to control the light sources. For example, a large building may be equipped with a lighting system that includes a large number of LED based light sources. The controller may be a central controller configured to manage and control the lighting system. The controller may control the operation of the LEDs, for example, to turn on/off the LEDs, and manage the operational states, for example, to manage power consumption or collect state information of the light sources.

The controller may manage and control the lighting based on a particular zone or group of light sources (e.g., a floor or room). The controller may detect areas in which unnecessary energy is being consumed to minimize waste. The controller may manage maintenance of equipment (e.g., maintenance schedules, fault detection, etc.) as well as maintenance of an inside environment of the building (e.g., operation based on schedules, occupancy, etc.) to control energy consumption.

One or more interfaces may be provided on each floor or zone in the building and connected in communication with the central controller. The interface may be configured to receive control inputs as well as to display operational states of the lighting apparatuses. The interface may include a GUI to control and manage the lighting system.

When attempting to control a large number of LEDs, either individually or as a group (e.g., room, floor, or building), network load may increase due to traffic from a large number of control data and event information, and a large amount of load may be placed on processors as well as the network.

Moreover, the lighting system may be configured to operate in a plurality of types of network environments. One such network environment in which the lighting system may be implemented is ZigBee based communication protocol. The ZigBee standard provides a wireless networking technology used in personal or local area networks, such as home networks. ZigBee is used for home/building automation and remote device control. ZigBee provides a low cost, low power consumption, relatively low data rates, and small device size wireless networking protocol solution for devices which do not require high speed communications and have a lower frequency of network usage. ZigBee is built upon the Physical (PHY) and Media Access Control (MAC) layers as defined in IEEE 802.15.4, for example. While the present disclosure is described with respect to a ZigBee based network, it should be appreciated that other types of communication protocols may also be used.

The lighting system and method, as broadly disclosed and embodied herein, enables automatically setting an address for each lighting device in a ZigBee network environment, and managing and controlling the lighting devices based on the set address. The lighting system may convert the address to a second address based on a prescribed identifier to improve authentication and security of devices joined in the network. The lighting system of the present disclosure improves the operation of the lighting to allow a more efficient utilization and conservation of energy resources.

FIG. 1 is a diagram illustrating a stack architecture according to an embodiment of the present disclosure. The network stack may be a ZigBee protocol stack which may include a PHY layer and a MAC layer as defined in the IEEE 802.15.4. A network layer (NWK layer) is provided over the PHY and MAC layers, and an application layer (APL) may be provided over the NWK layer. The APL layer may define an application framework and a ZigBee device object (ZDO), and may provide an interface between the application framework and the ZDO.

The NWK layer which is positioned over the PHY layer and MAC layer provides network security and routing management. An application support sublayer (APS layer) provides a function to maintain a table for binding. Here, the binding enhances the monitoring and controlling functions of a ZigBee coordinator by recognizing which devices of the network are connected with each other. The binding provides a service for transmitting a message between the connected devices, and it supports discovery of addresses and services for the devices and security management of the APS layer.

Figure 2A:
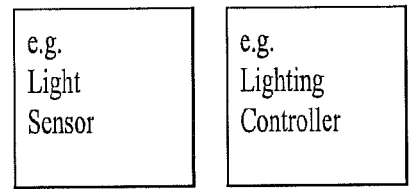
FIGS. 2A to 2C are diagrams illustrating types of devices according to an embodiment of the present disclosure.
Figure 2B:
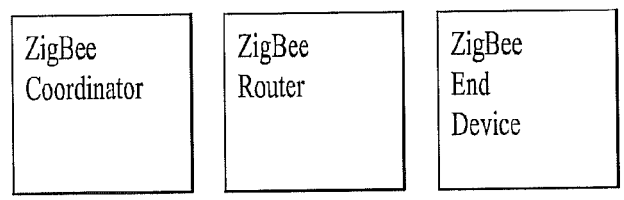
Figure 2C:
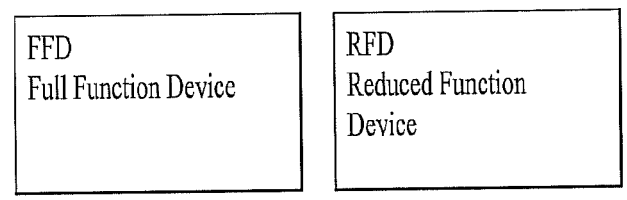

FIGS. 2A to 2C are a diagram illustrating types of devices according to an embodiment of the present disclosure. FIG. 2A illustrates an application device type, FIG. 2B illustrates a ZigBee logical device type, and FIG. 2C illustrates an IEEE 802.15.4 device type.

FIG. 2C illustrates types of a ZigBee hardware platform. The IEEE 802.15.4 device type may include a full function device (FFD) and a reduced function device (RFD). For example, the FFD and the RFD are distinguished by a function of the ZigBee device. The former supports P2P (Peer-to-Peer) and all of network topologies supported by the IEEE 802.15.4, and it can receive and transmit data between RFDs. In addition, the former may be employed as PAN coordinator. The latter can transmit data only at an end of the network topology.

FIG. 2C illustrates logical device types flowing in a specific ZigBee network. Such logical device types may include a ZigBee coordinator, a ZigBee router, and a ZigBee end device. FIG. 2A shows an end-user device types of the application device. The application device types may include a light sensor and a lighting controller. Those application device types may be examples of the ZigBee end device mentioned above, for example.

As mentioned above, the lighting system according to the present disclosure may support the ZigBee technology or ZigBee network described above. A ZigBee communication module may be used in lighting system construction and utilization. A method of setting addresses for the sensors and the lighting devices including light emitting diodes connected via the ZigBee network are disclosed herein. A method of managing and controlling the lighting devices having the set addresses are also disclosed herein. Here, the expression of 'managing' and 'controlling' may include controlling the lighting devices to turn on/off or to change a dimming degree as well as information collection (e.g., heat or human/motion sensing) based on information of the addresses set in the lighting devices. The ZigBee technology may support star, cluster tree and mesh Network topologies. Simply for base of explanation, the network is described with reference to the tree topology.

Figure 3:
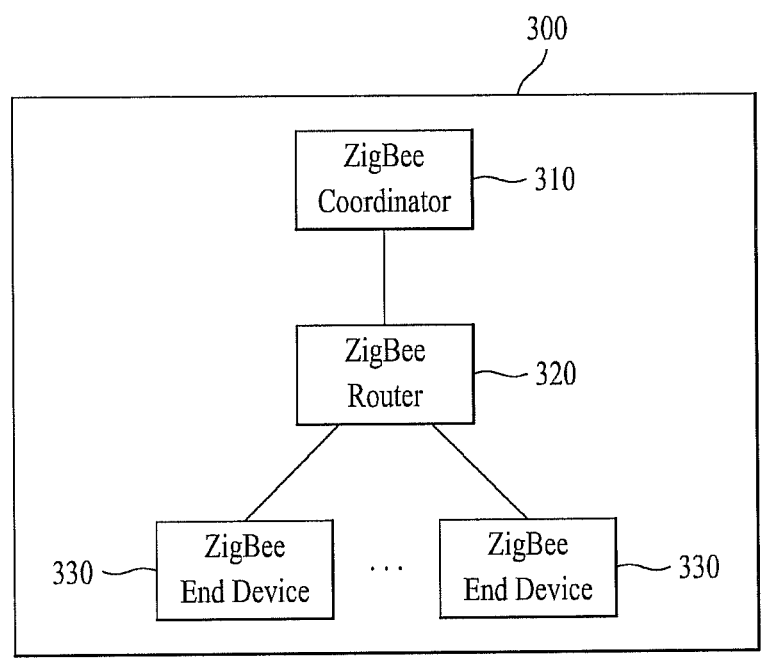
FIG. 3 is a diagram illustrating a personal network having a tree topology according to an embodiment of the present disclosure.

FIG. 3 is a diagram illustrating a personal area network (PAN) having a tree topology according to an embodiment of the present disclosure. A ZigBee PAN 300 having the tree topology of devices in a prescribed range is shown for configuring and operating the ZigBee network. The PAN 300 may include a ZigBee coordinator (ZC) 310, a ZigBee router (ZR) 320 and ZigBee end devices (ZED) 330 and 340. The ZigBee coordinator (ZC) 310 may be located in a center of the ZigBee PAN 300. The ZigBee router (ZR) 320 may be connected to the ZigBee coordinator (ZC) 310 and may perform a partial function of the ZigBee coordinator (ZR) 310, and used in expanding the network. The ZigBee end device (ZED) 330 and 340 may be connected to the ZigBee router (ZR) 320, located lower in the tree topology with respect to the ZigBee router (ZR) 320.

Relating to the present disclosure, the ZigBee coordinator (ZC) 310 relates to a specific PAN or finishes the relation, for example. Here, the device may refer to an entity which supports the ZigBee protocol stack shown in FIG. 1 and the present specification embodies the lighting devices, for example, light emitting diodes and sensors as that devices.

For example, the ZigBee router (ZR) 320 may refer to an entity which participates in the ZigBee network and can perform the same function of the ZigBee coordinator (ZC) 310 in a personal operating space. Such a ZigBee router (ZR) 320 can route messages between the devices and relations supported by the devices.

The ZigBee end device (ZED) 330 may be an entity which participates in the ZigBee network, not as ZigBee coordinator (ZC) 310 or the ZigBee router (ZR) 320. The ZED 330 may be the lighting device, for example. The ZigBee coordinator (ZC) 310 may be a master in the ZigBee PAN 300 and it may manage data communication in the ZigBee PAN 300. The ZigBee end device (ZED) 330 may include a device capable of communicating in the ZigBee PAN 300. The ZigBee coordinator (ZC) 310 mentioned above may be a gateway as described further hereinafter. For example, the ZigBee router (ZR) 320 or the ZigBee end device (ZED) 330 may be a lighting device as described further hereinafter. Implementing the lighting system ZigBee network may reduce initial costs and lower management costs to construct the lighting system.

Figure 4A:
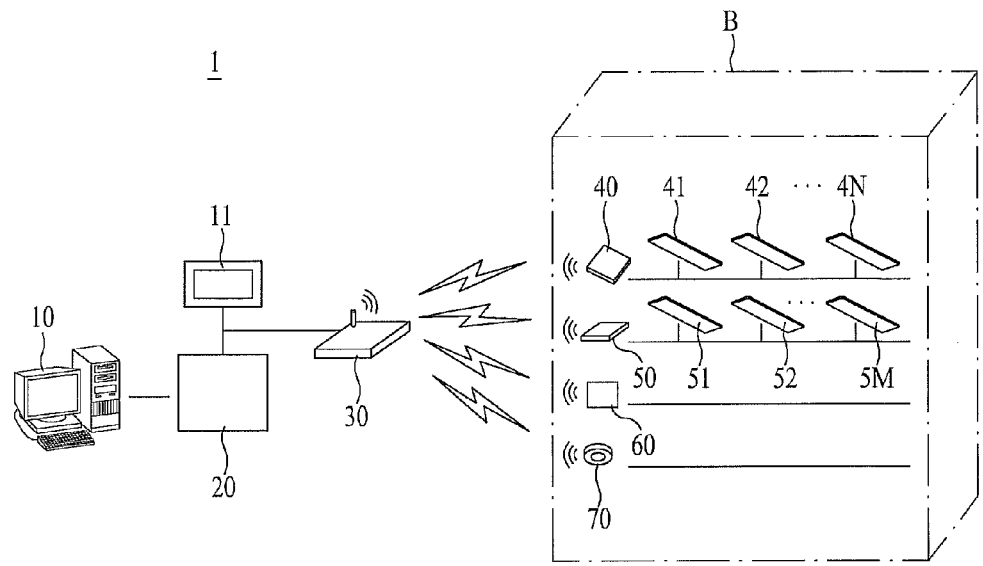
FIGS. 4A and 4B are diagrams of a lighting system according to an embodiment of the present disclosure.
Figure 4B:
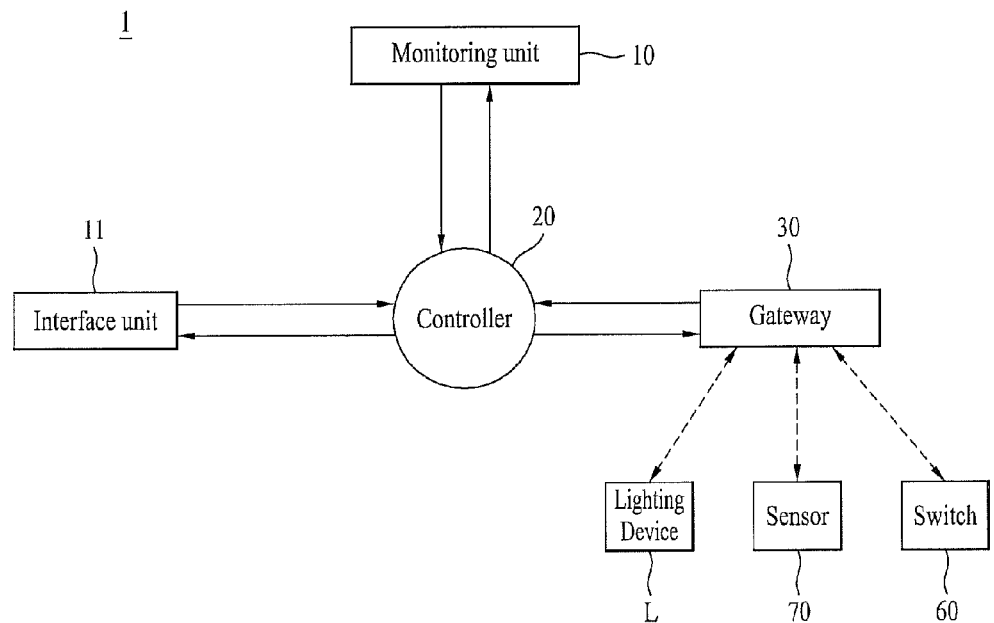

FIG. 4A is a schematic view of a lighting system and FIG. 4B is a block diagram of the lighting system in accordance with an embodiment of the present disclosure. The lighting system as disclosed herein may automatically assign a unique address to each lighting device, and control each lighting device assigned the unique address. The lighting system 1 may include a terminal 10, an interface 11, a lighting controller 20, a gateway 30, bridge devices 40, 50, a plurality of lighting apparatuses 41 to 4N, 51 to 5M (N, M: positive integers) connected to the bridge devices 40, 50 to enable communication, a switch 60, and a sensor 70. It should be appreciated that the lighting system 1 may include various combinations of the elements which are shown in FIG. 4A.

The terminal 10 may be connected to the lighting controller 20 to control the lighting device L. The lighting device L may include one or more of the bridge devices 40 and 50, the lighting apparatuses 41 to 4N, 51 to 5M, switch 60, or the sensor 70. The terminal 10 may be connected to the central lighting controller 20 to communicate over one or more of transmission control protocol/internet protocol (TCP/IP), Simple Object Access Protocol/Extensible Markup Language (SOAP/XML) Building Automation and Control Network (BACnet), or another appropriate type of protocol to exchange information within the lighting system 1.

The terminal 10 may store setup information for the lighting device L. The terminal 10 may manage state information and power consumption in real-time, including turning the lighting apparatuses on/off or changing the light intensity of the lighting apparatuses mounted in a particular zone. The terminal 10 may also detect areas which may be using unnecessary energy to minimize waste, manage equipment in the building, manage maintenance of equipment operation, manage maintenance of an inside environment of the building, manage energy and materials consumed through the above management operations, or the like. The terminal 10 may also initiate configuration of the lighting apparatuses 41 to 4N, 51 to 5M, for example, to initialize the addresses of one or more of the lighting apparatuses 41 to 4N, 51 to 5M.

The terminal 10 may be a desktop computer, laptop, display panel, personal digital assistant (PDA), tablet, or another appropriate type of device capable of performing the management functions. The terminal 10 may be connected over a distributed network through an appropriate type of network protocol such as the TCP/IP. The terminal 10 may be connected via wired or wireless connections. Moreover, the terminal 10 may be a Web server connected over the Internet to remotely control and manage the lighting device L.

In certain embodiments, a plurality of terminals 10 may be provided such that each terminal 10 may perform the management functions to control the lighting system 1. In this case, the plurality of terminals 10 may communicate with each other to synchronize information related to the management of the lighting system 1 such as operating schedules, or the like.

The interface 11 may be a display panel for inputting control inputs or displaying state information of the lighting system 1. The interface 11 may have a form factor which is smaller in size when compared to the terminal 10 which may allow the interface 11 to be easily installed throughout the building B. For example, the interface 11 may have a size and shape suitable to be wall mounted or used as a mobile device. An interface 11 may be provided on each floor or zone in the building B to receive control inputs from a user and to display a graphic user interface (GUI) for controlling and monitoring the lighting apparatuses 41 to 4N, 51 to 5M in the lighting system 1.

The display of the interface 11 may be a touch screen display. The interface 11 may communicate with the lighting controller 20, for example, to transmit inputs received through the GUI to the lighting controller 20 for controlling various groups/zones of lighting apparatuses. For example, the interface 11 may transmit control information to the lighting controller 20 to control an individual lighting apparatus or a group of lighting apparatuses such as an entire floor or building. The interface 11 may also receive status information, or the like, from the lighting controller 20. The interface 11 may display the received information on the GUI.

It should be appreciated that, while the interface 11 is described hereinabove as a display panel, the present disclosure is not limited thereto. For example, the interface 11 may be configured to have the same functionality as the terminal 10. The interface 11 may be a desktop terminal (e.g., a desktop computer), laptop, PDA, tablet, or another appropriate type of computing device. Moreover, while the terminal 10 and the interface 11 have been disclosed as being connected through the lighting controller 20, it should be appreciated that the terminal 10 and interface 11 may be connected such that signals are not necessarily routed through the lighting controller 20. For example, the terminal 10 and the interface 11 may be directly connected to each other or connected in a distributed network configuration with the lighting controller 20. Moreover, the interface 11 may be configured to communicate over various types of communication protocols, similar to the terminal 10 as previously described.

Moreover, one or more of the terminals 10 or the interfaces 10 may be configured as a management terminal while the remaining terminals 10 or interfaces 10 may be configured as user interfaces for state monitoring and for inputting user commands. A management terminal may be configured to have additional functionality than the remaining terminals, such as the capability to initiate assignment of addresses for the lighting apparatuses, configure zones or control groups to control a group of lighting, centrally store scheduling or user preference information, or the like.

The lighting controller 20 may be provided to control the operation of the lighting apparatuses 41 to 4N, 51 to 5M based on received inputs or an operational state of the lighting device L. The lighting controller 20 may be connected to the terminal 10, the interface 11, and the gateway 30. The lighting controller 20 may receive various control inputs for controlling the lighting apparatuses 41 to 4N, 51 to 5M from the terminal 10 or interface 11 and transmit appropriate control signals to the gateway 30 to control the lighting device L. The lighting controller 20 may receive monitoring information from the sensor 70. The lighting controller 20 may directly control the lighting apparatuses based on the received monitoring information and/or forward the monitoring information to the terminal 10 and interface 11 for processing and display thereon.

The lighting controller 20 may communicate with the monitoring terminal 10 or the interface 11 using various types of protocols, for example, SOAP or BACnet protocols in which XML based messages are exchanged over a network using HyperText Transfer Protocol (HTTP), Hypertext Transfer Protocol over Secure Socket Layer (HTTPS), Simple Mail Transfer Protocol (SMTP), or another appropriate type of protocol.

Moreover, the lighting controller 20 may store the addresses for each lighting apparatus 41 to 4N, 51 to 5M as well as the switch 60 and sensor 70. The lighting controller 20 may also store user preference information, scheduling information, zone or control group information, or another appropriate type of information to control and manage the lighting system 1. The lighting controller 20 may also control address configuration for the plurality of lighting apparatuses 41 to 4N, 51 to 5M through the gateway 30 and the bridge devices 40, 50. For example, the lighting controller 20 may generate data packets including address information for setting the address in each of the lighting apparatuses. In certain embodiments, the bridge devices 40, 50 may be configured to control address configuration for the lighting apparatuses 41 to 4N, 51 to 5M, as described in further detail hereinafter. Moreover, the lighting controller 20 or the bridge devices 40, 50 may include an address assigning device for controlling the address assigning process including generating the addresses for the lighting apparatuses 41 to 4N, 51 to 5M.

The lighting controller 20 may be installed separately or may be integrated into a management terminal 10. For example, the terminal 10 may be configured as a central management terminal and installed in a main equipment room or at a remote location outside the building B and the lighting controller 20 may be mounted on each floor of the building B. Alternatively, the terminal 10 and the lighting controller 20 may be integrated and installed as a single apparatus.

The gateway 30 may communicate with the lighting controller 20 to receive control signals from the lighting controller 20 for group/individual lighting control. The gateway 30 may forward the received control signals to the lighting device L (e.g., bridge devices, lighting apparatus, switch, or sensor) to control the same. The gateway 30 may also relay messages from the lighting device L to the lighting controller 20. The gateway 30 may communicate with the lighting controller 20, the bridge devices 40, 50, the switch 60, or sensor 70 over a wireless or wired connection. The gateway 30 may be configured to communicate with the lighting controller 20 over TCP/IP or another appropriate type of communication protocol. In one embodiment, the gateway 30 may be a ZigBee gateway.

A plurality of bridge devices 40, 50 may be connected to the gateway 30 and the plurality of the lighting apparatuses 41 to 4N, 51 to 5M to enable communication therewith for transmitting the control signals from the gateway 30 to the lighting apparatuses 41 to 4N and 51 to 5M. The bridge devices 40, 50 may also transmit a response or event information from the lighting apparatuses 41 to 4N, 51 to 5M to the gateway 30. Moreover, the bridge devices 40, 50 may be configured to control the address configuration for the lighting apparatuses 41 to 4N, 51 to 5M.

The plurality of bridge devices may each be connected to a group of lighting apparatus. For example, the first bridge device 40 may be connected to a first group of lighting apparatuses 41 to 4N and the second bridge device 50 may be connected to a second group of lighting apparatuses 51 to 5M to enable communication therewith. The bridge devices 40, 50 may be connected up to a prescribed maximum number of lighting apparatuses. In one embodiment, the bridge devices 40, 50 may be connected up to 12 lighting apparatuses.

The bridge devices 40, 50 may be connected to the gateway 30 using the ZigBee specification. The bridge devices 40, 50 may be connected to the lighting apparatuses 41 to 4N, 51 to 5M using the RS-485 protocol which is a serial communication protocol. An input received, for example, at the interface 11 may be transmitted to the lighting controller 20, the gateway 30, and the corresponding bridge devices 40, 50 in succession. The bridge device 40 may transmit the received commands to the appropriate lighting apparatus through the serially connected lighting apparatuses 41-4N. Likewise, bridge device 50 may forward the commands to an appropriate lighting apparatus 51 to 5M serially connected thereto. For example, a command to turn off lighting apparatus 42 may be serially transmitted through lighting apparatus 41.

A response from the lighting apparatuses 41 to 4N, 51 to 5M may be transmitted to corresponding bridge devices 40, 50, the gateway 30, the lighting controller 20, and the terminal 10 and interface 11, in succession. For example, data packets from lighting apparatus 42 may be transmitted to lighting apparatus 41 and then to bridge device 40 over the RS-485 protocol. The data packets may then be forwarded to gateway 30 using ZigBee.

In accordance with the present disclosure, the bridge devices 40, 50 may generate address data and transmit data packets including the address data to each serially connected lighting apparatuses 41 to 4N, 51 to 5M for configuring the addresses. The bridge devices 40, 50 may convert received data packets into a format compatible with the destination lighting apparatus 41 to 4N, 51 to 5M. The bridge devices 40, 50 may also format data received from the lighting apparatus 41 to 4N, 51 to 5M in a format compatible with the central lighting controller 20. Alternatively, the address data may be generated in the lighting controller 20 rather than in the bridge device 40 and transmitted to a corresponding lighting apparatus 41 to 4N, 51 to 5M through the bridge device 40.

The lighting apparatuses 41 to 4N, 51 to 5M may be one of a plurality of types of light sources including, for example, an LED type light source. The lighting apparatuses 41 to 4N, 51 to 5M provided in the building B may be a flat type or a bulb type light source. The lighting apparatuses 41 to 4N, 51 to 5M may include or more LEDs which have a color rendition which is higher than Ra 75, and an efficiency which is higher than 65 lm/W.

The lighting apparatuses 41 to 4N, 51 to 5M may be connected in series over the RS-485 protocol. Each lighting apparatus 41 to 4N, 51 to 5M may be configured to intercept or forward a control command received from a previous device. For example, a control command to initiate address configuration may be intercepted by a lighting apparatus to set a new address or transmitted in series to a subsequent lighting apparatus. The lighting apparatuses 41 to 4N, 51 to 5M may also include circuitry to control light intensity of the LEDs (e.g., dimming).

The building B may include a switch 60 to control one or more of the lighting apparatuses 41 to 4N, 51 to 5M (e.g., dimming or to turn the lighting apparatuses on/off), and a sensor 70 to sense light intensity, or the like. The switch 60 and sensor 70 may be integrated into the lighting apparatuses 41 to 4N, 51 to 5M or installed separately in the building B.

It should be appreciated that the connection scheme between the bridge devices 40, 50 and the gateway 30 may be the same as the connection scheme between the bridge devices 40, 50 and the lighting apparatuses 41 to 4N, 51 to 5M. For example, the bridge devices 40, 50 and the lighting apparatuses 41 to 4N, 51 to 5M may be configured to communicate according to the ZigBee standard. Simply for ease of description, however, the connection between the bridge devices 40, 50 and the lighting apparatuses 41 to 4N, 51 to 5M is described herein as being connected over the RS-485 protocol.

Moreover, it should be appreciated that the lighting system 1 may include a combination of the previously disclosed elements and is not limited to the configuration as illustrated in FIGS. 1 and 2. Furthermore, the lighting system 1 may be implemented as a hybrid solution as well as a legacy solution to interface with legacy lighting apparatuses.

For example, the hybrid solution may include a combination of devices, as shown in FIGS. 1 and 2. That is, the hybrid solution may include one or more bridge devices 40, 50, gateways 30, lighting apparatuses 41 to 4N, 51 to 5M, switches 60, and/or sensors 70. Alternatively, a legacy solution may include a lighting controller 20 connected according to a third party protocol scheme to various combinations of a Network Control Unit (NCU), a Lighting Interface Unit (LIU), a Central Processing Unit (CPU), a Transmission Unit (TU), a relay, a program switch, etc. The address initialization of the lighting apparatuses as broadly disclosed and embodied herein may be applicable to legacy lighting apparatuses.

Figure 5:
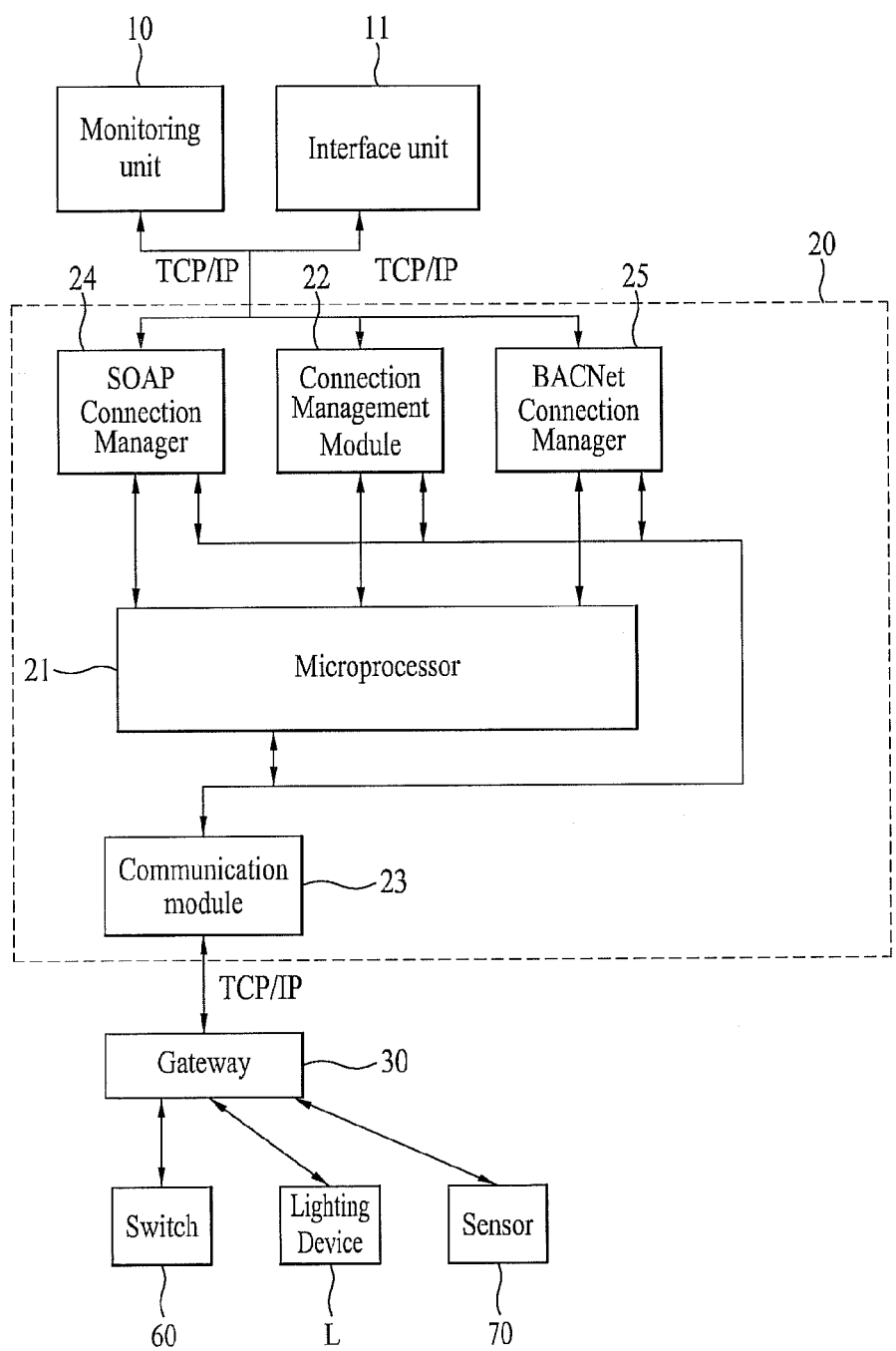
FIG. 5 is a block diagram of a controller in the lighting system according to an embodiment of the present disclosure.

FIG. 5 is a block diagram of the central lighting controller 20 of FIGS. 1 and 2. The lighting controller 20 may include a microprocessor 21, a connection management module 22, a communication module 23, a SOAP connection manager 24, and a BACnet connection manager 25.

The microprocessor 21 may be configured for processing data for controlling the lighting device L. The microprocessor 21 may receive commands from the terminal 10 or interface 11 through the SOAP connection manager 24 and/or the BACnet connection manager 25. The microprocessor 21 may process the received commands to generate a control data packet and transmit the generated control data packet to the lighting device L through the communication module 23. Moreover, the microprocessor 21 may generate a response or event information related to the received commands and transmit the information to the terminal 10 or interface 11 through the connection management module 22.

The microprocessor 21 may perform group based control, individual based control, pattern control, schedule based control, power failure and power recovery control, illumination sensor interoperable control, or the like, for controlling and monitoring the lighting apparatus 41 to 4N, 51 to 5M, the switch 60, and/or the sensor 70.

The communication module 23 may control communication between the lighting controller 20 and the gateway 30. The communication module 23 may format or convert data received from the microprocessor 21 into a format compatible with the lighting apparatus 41 to 4N, 51 to 5M, the switch 60, or the sensor 70. The communication module 23 may transmit the formatted data to the gateway 30. The communication module 23 and the gateway 30 may transmit and receive, for example, TCP/IP packets. In addition, the communication module 23 may transmit to the microprocessor 21 a response or event information received from the gateway 30.

Upon receiving the control command from the terminal 10 or interface 11, a corresponding one of the connection management module 22, the SOAP connection manager 24, or the BACnet connection manager 25 may convert the received control command into an internal language capable of being recognized by the lighting controller 20. The formatted control command may then be transmitted to the microprocessor 21. That is, one of the connection management module 22, the SOAP connection manager 24, or the BACnet connection manager 25 may interpret or convert the data from a protocol corresponding to either the terminal 10 or the interface 11 to the required format.

Figure 6:
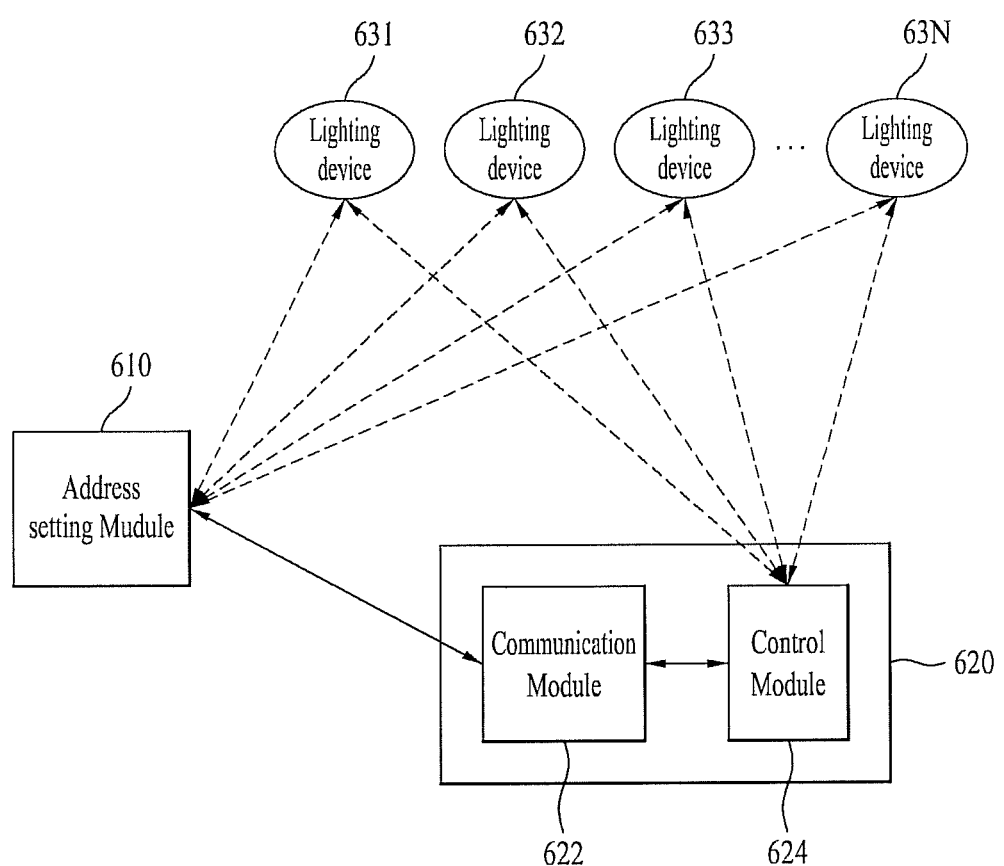
FIG. 6 is a diagram illustrating a relationship between components of the lighting system for setting and controlling an address according to an embodiment of the present disclosure.

FIG. 6 is a diagram illustrating a relationship between components of the lighting system for setting and controlling an address according to an embodiment of the present disclosure. An address setting module 610 may be communicatively connected to a program switch 620 and a plurality of lighting devices 631 to 63N (N: a positive integer) to assign addresses in the lighting system. The connection may be a wireless or wired connection. Moreover, the number of lighting devices and program switches may be greater than or less than as illustrated in FIG. 6.

The address setting module 610 may configure addresses for the lighting devices 631 to 63N and the program switch 620, respectively. For that, the address setting module 610 may include a commissioning tool for setting the addresses. Here, the commissioning tool may be implemented in hardware or software including a program for setting the addresses, for example. In addition, the address setting module 610 may be a handheld device including a PDA, a mobile phone, a smart phone, or a fixed device such as a PC with a GUI, for example. Moreover, the address setting module 610 may be implemented in a device dedicated for address setting or may be incorporated into other devices in the lighting system, such as the terminal 10, interface 11, or another appropriate device.

The address setting module 610 may include a ZigBee communication module or connected to a ZigBee communication module of the communication module 622 in the program switch 620. The address setting module 610 may set or reset an address for a program switch 620 or the lighting devices 631 to 63N by communicating over a ZigBee communication protocol. Also, the address setting module 610 may directly communicate over ZigBee with a particular lighting device that requires a new address to be set or to reset a previously assigned address.

The program switch 620 and the lighting devices 631 to 63N may communicate with the address setting module 610 using a default or basic address during the address setting process. The default first address may include a default channel and a default PAN identifier during initial phases of the address assignment process, prior to being assigned a permanent address.

For example, the program switch 620 and each of the lighting devices 631 to 63N may initiate a connection with the address setting module 610 using the default basic address. Then, a second address may be assigned to replace the default first address. The program switch 620 and each of the lighting devices 631 to 63N may store the received second address in a memory thereof.

The program switch 620 may include a control module 624 to control the communication module 622 and the lighting devices 631 to 63N. For example, the control module 624 may perform dimming control and on/off control of each lighting device 631 to 63N. The control module 624 may receive and store address information corresponding to the lighting devices 631 to 63N from the address setting module 610 or a controller (not shown) that are within a predetermined range or operational area of the program switches 620. In addition, the control module 624 may receive a control signal for controlling the lighting devices 631 to 63N based on the address information received from the controller or the address setting module 610. The lighting devices may include light emitting diodes (LEDs) and sensors, for example. Moreover, a gateway (not shown) may be communicatively connected to the address setting module 610, the program switch 620, and the lighting devices 631 to 63N in the process described above.

The address setting module 610 communicates with a target ZigBee device using the commissioning tool over a commissioning channel, namely, a basic channel and a basic PAN ID. The basic channel and basic PAN ID may be a default channel and PAN ID. The commissioning tool may use the default channel and PAN ID to initially connect for address assignment. Because of that, fast commissioning and systematic address management can be facilitated to achieve fast and effective device commissioning. As a result, the smart wireless lighting system may be controlled.

Figure 7:
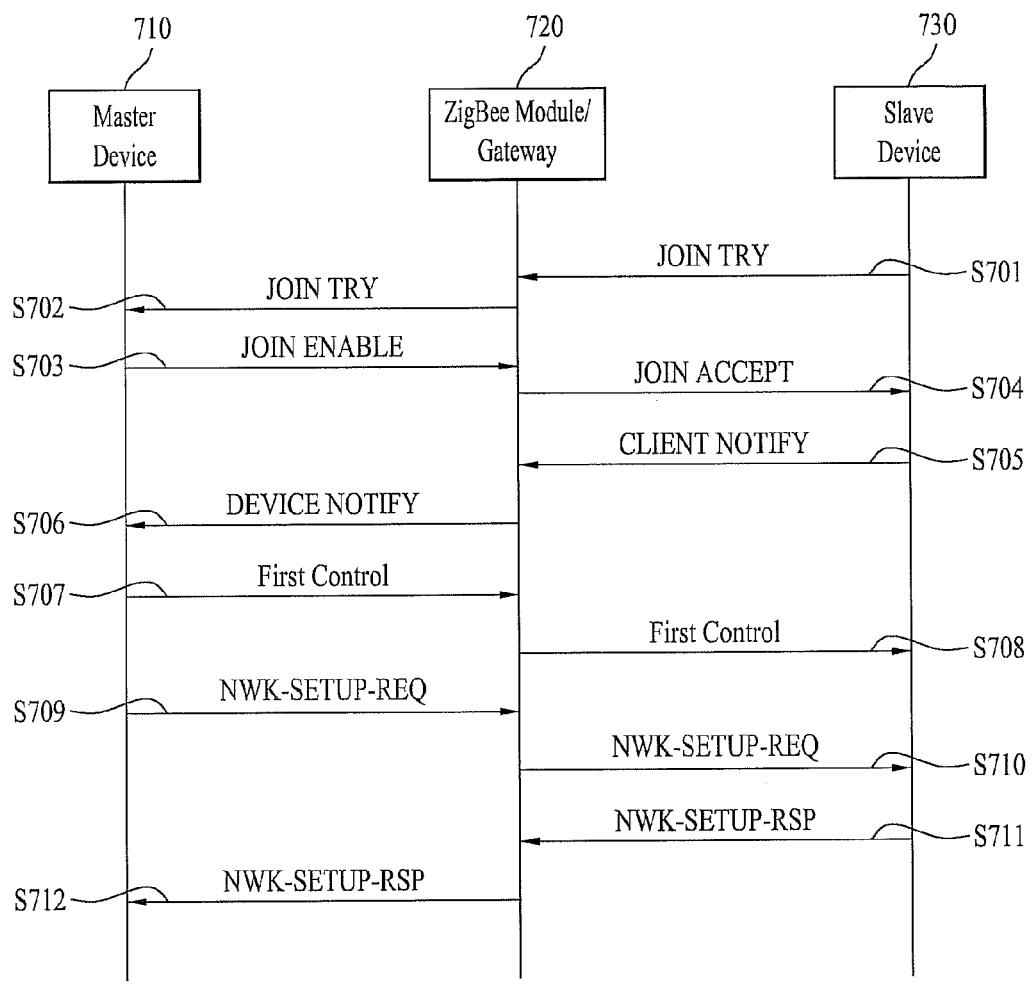
FIG. 7 is a flow diagram illustrating a process for setting and managing an address according to an embodiment of the present disclosure.

FIG. 7 is a flow diagram illustrating a process for setting and managing an address according to an embodiment of the present disclosure. When using only MAC and/or ZigBee network addresses, it may be difficult to identify a corresponding device having the set address in a wireless lighting control system. For example, it may be time consuming to visually identify a device that corresponds to a particular MAC or ZigBee address. Moreover, it may be inconvenient and difficult to manage the address of the corresponding devices. Hence, address management and assignment may become complex and time consuming especially when devices are commissioned across several floors in a large building or a factory.

In this embodiment, a master device 710 having a commissioning tool for setting addresses may be connected to a plurality of slave devices 730 in a ZigBee network. Here, at least one slave device may be reset, requiring a new address. When receiving an address setting request message from the reset slave device, an address packet including address information of the slave device is transmitted. Here, the master device may be any device with the commissioning tool, for example, a control device, a gateway, or a controller. The master device may include the address setting module. The slave device may be a lighting device, for example, a lighting emitting apparatus, a sensor, or a program switch.

The master device can control the slave devices having addresses set based on the transmitted address packet by a group unit and/or an independent unit. For example, the address packet may include at least one of channel information for communication with the slave devices, a node identifier (ID) to which the slave devices belong, PAN IDs (PAN_ID) for the slave devices, an extended PAN ID (Ext_PAN_ID) for security and authentication of the slave devices, and device address information for device identification and prevention of address assignment for other devices. Especially, a use of the extended PAN ID (Ext_PAN_ID) may prevent devices which are not authorized from initiating address assignment and joining the network. Because of that, the lighting system may be prevented from outside threats, and resulting failure of the system may be prevented.

The address packet may include a header section, a data section, and a tail section. For example, the header section may be used for identification of a corresponding packet. In other words, an identifier that identifies the corresponding packet as an address packet as well as other types of information may be included the header section. For example, information related to the path or an amount of data in the corresponding address packet may be included in the header section.

The data section of the address packet may include address information. Here, the address information may refer to at least one of channel information, node identifier information, PAN ID information, expanded PAN ID information, or the device address information. The tail section may include a checksum including cyclic redundancy check (CRC), together with an indicator that indicates the end of the packet. Additional information may also be included in the packet, and the packet may be similar to a control packet which is described hereinafter. In this case, control command information including address information (address information for identifying a corresponding device based on set address information) and an identifier for control comment contents may be included in the data area, for example. Before the address is assigned, the commissioning tool of the master device may use a default channel and a default PAN ID during the address setting process. The default channel and the default PAN ID may be factory set values.

In addition, the master device may transmit a response message to a slave device which requested address assignment using the current network address of the slave device. The master device may also use information in a response message from the slave device corresponding to a query from the master device (e.g., a request for confirming an existence or presence of a slave device on the network). At this time, the current network address information may include at least one of information related to an access channel to the master device, PAN ID of the slave devices, or network address information of a node to which the slave devices belongs. In addition, the existence confirming message may include an on/off command to confirm existence of the corresponding device.

The slave devices may notify the master whether the address setting process was successful or unsuccessful after receiving the address packet. Also, each of the slave devices may include a memory to store the address information included in the address packet. The slave may receive an independent control packet based on the address information stored in the memory.

Moreover, a ZigBee module or a gateway for communicating based on the ZigBee standard may be connected between the master device 710 and the slave devices 730. The ZigBee module may be integrated into the master device 710 or provided separately. If a gateway 720 is provided between the master device 710 and the slave devices 730, the ZigBee module may be incorporated in the gateway 720.

Simply for ease of description, parameters between devices relating to the setting, managing, and controlling of the addresses are disclosed as being received and transmitted based on a packet type. However, it should be appreciated that the present disclosure is not limited to a packet type, and other methods may be used based on the standards or protocols of the network.

In step S701, a JOIN TRY packet is transmitted to the ZigBee module/gateway 720 from the slave devices 730 headed for the master device 710. Here, the JOIN TRY packet may be a request for address setting for a corresponding device to join the network. Here, the master device 710 includes a commissioning tool for setting and/or managing an address of a lighting device which will be included in the lighting system. In other words, the process as illustrated in FIG. 7 may be controlled by the commissioning tool of the master device 710. For example, the commissioning tool may be software programmed to set and/or manage an address in the ZigBee network environments.

The commissioning tool of the master device 710 may be set or formatted to a default channel and a default PAN ID or it may include information relating to the default channel and the default PAN ID. In other words, in step 710, the slave devices 730 may use the default channel and the default PAN ID in its request to join the network.

The JOIN TRY packet may be sent by the slave devices 730 after the slave devices 730 have been reset or newly connected in a ZigBee network environment. In other words, step S701 may be performed in response to an addition or change of the slave devices 730. For example, the change may include deletion of a corresponding device. In this case, the gateway 720 updates those contents in a memory provided therein to transmit it to the controller. This is because information stored in the memory of slave devices 730 (e.g., previously assigned addresses) are reset when the slave devices 730 are reset or newly added to the ZigBee network environments. At this time, the rest memory information may include the preset address information such as default or factory set information, for example. As a result, the slave devices 730 may request the master to join the network (e.g., request address setting) because they have not been registered and do not yet have assigned addresses.

When receiving the JOIN TRY packet from the slave devices 730, the ZigBee module or gateway 720 transmits the received JOIN TRY packet to the master device 710, in step S702. At this time, the ZigBee module or gateway 720 may reformat or change a type or contents of the received packet to allow the master device 710 to read, decode, or recognize the received packet.

When receiving the JOIN TRY packet from the slave devices 730, the commissioning tool of the master device 710 may determine an address setting of the corresponding device 730. The master device 710 may construct a packet corresponding to the received JOIN TRY packet based on the result of the determination and it transmits the constructed packet via the ZigBee module or gateway 720, in step S703. In this case, the master device 710 constructs a JOIN ENABLE packet if an address has to be set in the corresponding slave device based on the result of the determination. Otherwise, a JOIN UNABLE packet may be generated.

When the JOIN UNABLE packet is transmitted to the slave device 730, the slave device may retransmit a JOIN TRY packet periodically or randomly until it receives the JOIN ENABLE packet. Alternatively, the frequency of transmission may be limited to a predetermined value. In this case, if the JOIN ENABLE packet is not received after a predetermined number of attempts, the slave devices 730 may be reset again or it may be determined that the corresponding slave device is defective.

In the above process, the commissioning tool may control the ZigBee module/gateway 720 not to receive JOIN TRY packets from any other devices, until a JOIN ENABLE packet is successfully transmitted, for example. In other words, when the JOIN ENABLE packet is transmitted after receiving a JOIN TRY packet from a specific slave device, JOIN TRY packets from other devices may be received. Here, the other devices may include the other slave devices belonging to a specific PAN.

The JOIN ENABLE packet allows the corresponding slave device to join the network and a new address to be set in the corresponding device. The ZigBee module/gateway 720 may receive the JOIN ENABLE packet sent from the master device 710 and convert the JOIN ENABLE packet into a JOIN ACCEPT packet which can be identified by the corresponding slave device 730, in step S704.

The slave device having received the JOIN ACCEPT packet may construct a CLIENT NOTIFY packet to notify its presence of the slave device to the master device 710, and transmit the CLIENT NOTIFY packet to the master device 710, in step S705. The ZigBee module/gateway 720 may correct or reformat the CLIENT NOTIFY packet received from the corresponding slave device to a DEVICE NOTIFY packet to allow the master device 710 to recognize the received packet, and then transmit the corrected or reformatted packet to the master device 710, in step S706.

When receiving the DEVICE NOTIFY packet from the ZigBee module/gateway 720, the master device 710 may display the corresponding slave device on a GUI on a display of the master device 710. After that, the master device 710 may notify contents corresponding to the slave device displayed at the GUI to the commissioning tool.

The commissioning tool of the master device 710 confirms or recognizes the existence of the corresponding slave device, before transmitting a first control packet for setting an address to the corresponding slave device, in step S707. The ZigBee module/gateway 720 applies necessary corrections or changes to the first packet in order for the slave devices 730 to receive and recognize the first control packet transmitted from the master device 710, and then transmits the corrected or converted packet to the slave device, in step S708.

At this time, the first control packet may be provided to confirm or recognize the corresponding device and may include a control command to control the light emitting apparatus to blink based on characteristics of the devices. The slave device may be controlled to blink according to a prescribed pattern to provide a visual feedback regarding its status. Here, the control command may control colors or a degree of dimming, or the like. In addition, the control command may include detailed information related to the pattern of the blinking, for example, a blink period, kinds of colors, or a degree of dimming. Alternatively, the control command may be a combination of commands rather than a single command.

When the corresponding slave device is operated according to the control command of the master device 710, the master device may assign an address to the slave device. To set the address, the master device 710 transmits a NWK-SETUP-REQ packet to the ZigBee module/gateway 720, in step S709, and the ZigBee module/gateway 720 transmits the NWK-SETUP-REQ packet to the corresponding slave device, in step S710.

In other words, the master device 710 may transmit ZigBee network information for commissioning to the slave device. For example, the ZigBee network information included in the NWK-SETUP-REQ packet may include at least one of channel information for communicating with the slave device, ID of the node to which the slave device belongs, PAN ID of the slave device, an expanded PAN ID for security and authentication of the corresponding slave device, and device address information for identification of the devices.

The slave devices 730 may convert the received information to a channel, PAN_ID, and EXT_PAN_ID necessary to join the network based on the information included in the NWK-SETUP-REQ packet. The slave devices 730 may change addresses to the node ID (for example, product addresses) stored in the memory provided therein and may store the information included in the NWK-SETUP-REQ packet in the memory.

Moreover, the EXT_PAN_ID of the NWK-SETUP-REQ may provide security or stability by preventing unauthorized access or binding to the lighting system supporting the ZigBee network, in addition to the conventional effects. For example, the master device 710 may transmit an EXT_PAN_ID in the NWK-SETUP-REQ that corresponds to the EXT_PAN_ID set in each of the other slave devices in the network. If an EXT_PAN_ID of a slave device requesting to join the network does not match the EXT_PAN_ID stored on the master, the device may be prevented from gaining access to the lighting system. In one embodiment, the EXT_PAN_ID may correspond to an ID common to a group of device. For example, a manufacturer of a light may have a unique EXT_PAN_ID associated with its products. In this case, only lights from the same manufacturer as the other exiting devices may join the network. This process may prevent the lighting system from being controlled by an outsider as well as prevent errors of the lighting devices (due to compatibility, etc.).

Thereafter, the slave devices 730 may construct a NWK-SETUP-RSP packet corresponding to the NWK-SETUP-REQ packet to notify the completion of the address setting process. The slave devices 730 may transmits to the constructed NWK-SETUP-RSP packet to the ZigBee module/gateway 720, in step S711. The ZigBee module/gateway 720 may transmit the received NWK-SETUP-RSP packet to the master device 710 completing the address setting process, in step S712.

The corresponding slave device having finished the address setting transmits a packet notifying the completion of the ZigBee network information setting to the commissioning tool. At this time, the corresponding slave device may blink an alarm light to provide a visual notification of the completion of the address setting process. However, if the setting was not completed, the corresponding slave device may blink the alarm light to indicate that address setting was unsuccessful. In this case, a pattern of the blinking alarm light (e.g., frequency per second of the alarm light) may be different than the pattern of light for indicating completion of the process. It should be appreciated that other types of notifications may be provided, such as pop-up windows on a display, emails or text messages to an administrator, an audible alarm, or the like.

The master device may set an address for each of the slave devices by using the above process. In addition, the master device 710 may wait for the NWK-SETUP-RSP packet from the corresponding device 730 after transmitting the NWK-SETUP-REQ packet, in the step of S708. During this period, the master device 710 may be configured to not assign an address to another slave device requesting to join the network.

If the NWK-SETUP-RSP packet from the corresponding slave device is not received for a predetermined time period after transmitting the NWK-SETUP-REQ packet in the step of S708, the master device 710 may re-transmit the NWK-SETUP-REQ packet or an additional packet requesting the NWK-SETUP-RSP packet. For example, the re-transmitted NWK-SETUP-REQ packet may include address information which is different than the address information previously sent in the original NWK-SETUP-REQ packet.

If the NWK-SETUP-RSP packet in response to the NWK-SETUP-REQ packets transmitted to the corresponding slave is not received for a predetermined number of attempts, the master device 710 may reset all of the former processes. In this case, the master device 710 may request transmission of a JOIN TRY packet to restart the procedure, for example. If the JOIN TRY packet is overlapped with a JOIN TRY packet that is transmitted from other devices, the master device 710 may prioritize the JOIN TRY packets sent from the slave devices for processing. Here, the former slave device may be given priority.

Figure 8:
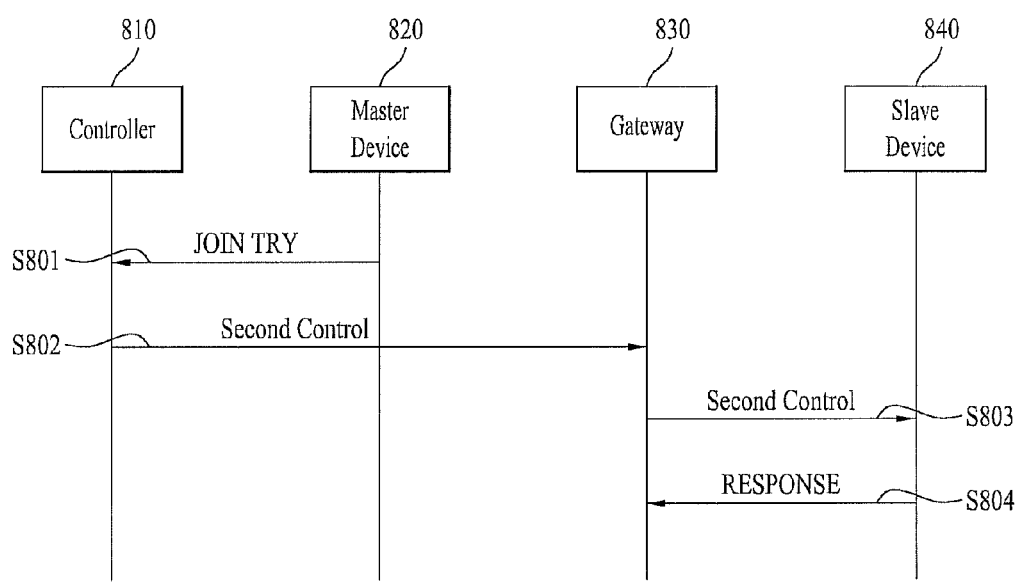
FIG. 8 is a flow diagram illustrating a process for controlling slave devices according to an embodiment of the present disclosure.

FIG. 8 is a flow diagram illustrating a process for controlling slave devices according to an embodiment of the present disclosure. Corresponding to the completion of address assignment, in step S711 of FIG. 7 as described above, the master device 820 may transmit a JOIN TRY packet to the controller 810, in step S801. For example, when receiving the NWK-SETUP-RSP of a corresponding slave device, a master device 820 may determine that commissioning and address setting of the corresponding slave device has completed. The master device 810 may then transmit information related to the commissioning and the address setting to a controller 810. The information related to the newly commissioned slave device may allow the controller to control the newly added or reconfigured slave devices.

The controller 810 may stores the information associated with the slave device 840 which is assigned the new address and construct a packet to control the slave device 840. The controller 810 may transmit the constructed second control packet to a gateway 830, in step S802. The gateway 830 may identify the slave device which is an object of the second control packet received from the controller 810. The gateway 830 processes the second control packet as necessary and transmits the processed second control packet to the identified slave device 840, in step S803. The slave device 840 may transmit a response packet corresponding to the second control packet, in step S804.

Figure 9:
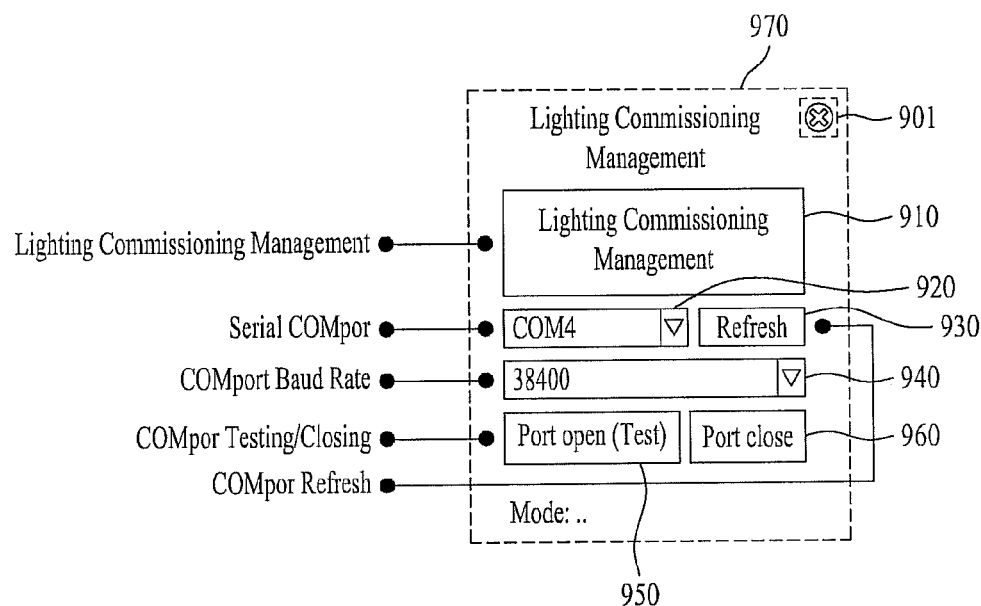
FIG. 9 is a diagram of a lighting commissioning management screen according to an embodiment of the present disclosure.

FIG. 9 is a diagram of a lighting commissioning management screen according to an embodiment of the present disclosure. The lighting commissioning management screen 901 may be displayed on a commissioning device, such as the address setting module as described above. The commissioning management screen 901 may include a serial port number commissioned or set to be commissioned which may be based on a communication speed. The commissioning device may be a PDA, smart phone, tablet, or another appropriate device having a commissioning tool and a suitable OS such as Windows.

The lighting commissioning management screen 901 may include a lighting commissioning management configuration field 910, a serial COM port configuration field 920, a COM port refresh configuration button 930, a COM port baud rate configuration field 940, and COM port testing/closing configurations buttons 950 and 960.

The serial COM port configuration field 920 may display connected serial COM ports (for example, COM4) and the COM port baud rate configuration field 940 may display a speed of a corresponding serial port. For example, a serial COM port and a COM port baud rate may be selected by a user using a drop down menu, for example. The user may select COM4 as the serial COM port and 38400 as COM port baud rate, as illustrated in FIG. 9. The value 38400 may be a default value.

When the port testing configuration button 950 is selected, the commissioning device may open a serial port by using a preset port number. At this time, if the port testing is performed normally, a port testing completion (initialization) UI may be displayed on the lighting commissioning management screen 901 and the lighting commissioning management configuration field 910 may be activated by the selection. When the port testing is performed normally, an internal network initialization command is transmitted. Here, if the port testing is not performed normally, it is confirmed whether the ZigBee module is connected normally. Moreover, a program is stopped by using a Cancel button 970 in an upper right corner of the lighting commissioning management screen shown and the program may restart to reset the port information and to perform the port testing.

The lighting commissioning management configuration 910 may be activated by implementation of the port testing configuration button 950 and it controls a lighting commissioning management function. When the port closing button 960 is selected, the lighting commissioning management configuration 910 is deactivated. The refresh button 930 may refresh a list of available serial COM ports.

Figure 10:
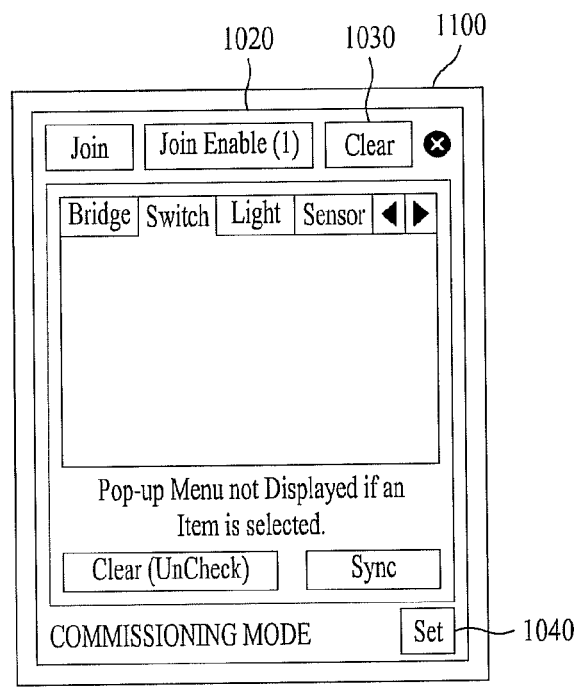
FIG. 10 is a diagram of the lighting commissioning management screen according to another embodiment of the present disclosure.

FIG. 10 is a diagram of the lighting commissioning management screen according to another embodiment of the present disclosure. The lighting commissioning management screen 1001 may be displayed when the lighting commissioning management configuration 910 is selected for the lighting commissioning management screen 1100 may guide the process for joining a program switch using the commissioning tool.

A selection of a Join Enable button 1020 searches for initialized devices and displays the number of devices in parenthesis. For example, the number of the devices detected is displayed to be '1', as shown in FIG. 10. A Clear button 1030 deletes icons corresponding to all the switches displayed on the screen 1001 of the commissioning tool. For example, an icon corresponding to a switch displayed under the switch tab indicates that a switch device to be installed is detected by the commissioning tool and a ZigBee address is displayed below the icon. The ZigBee address may be defined as '0xXXXX' with 2 bites. A Set button 1040 may be configured to set a network for the commissioning tool. For example, a factory initialized value is not changed in a commissioning mode and it may not be set in this step.

Figure 11:
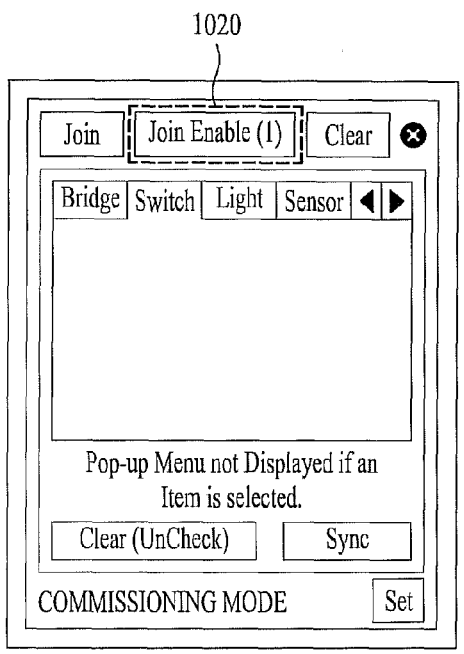
FIGS. 11 to 13 are diagrams of a display illustrating a process for configuring a switch according to an embodiment of the present disclosure.
Figure 12:
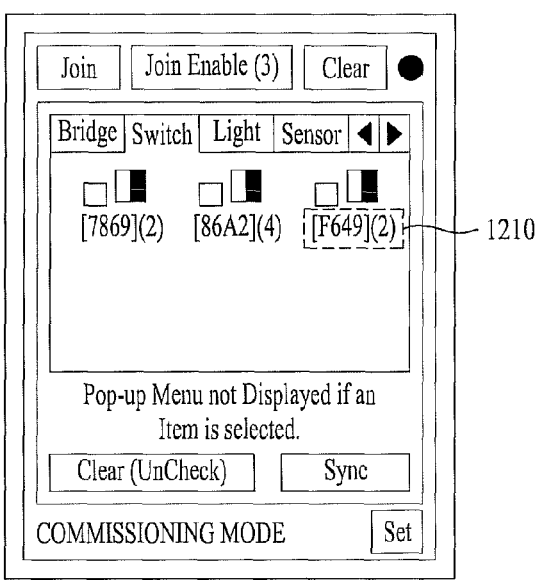
Figure 13:
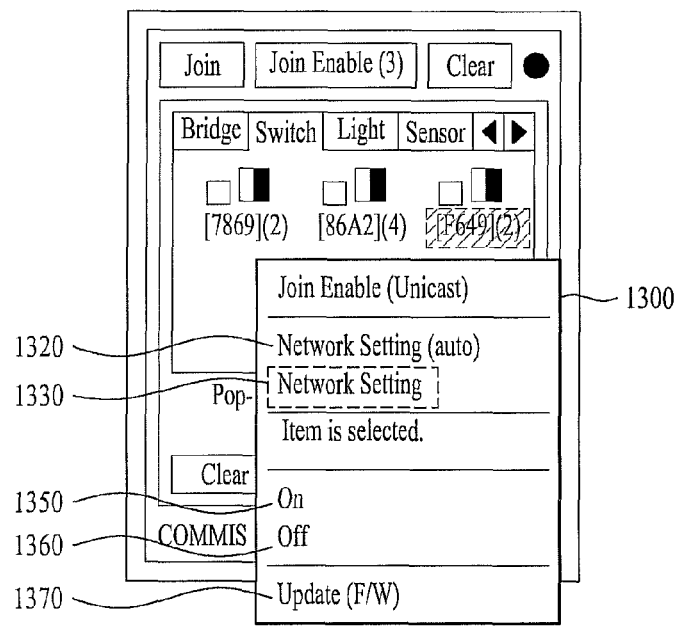
Figure 14:
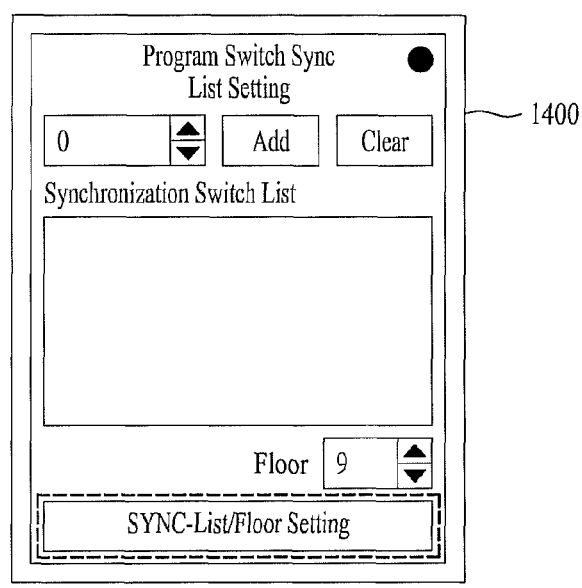
FIGS. 14 to 16 are diagrams of a display illustrating a process for configuring a switch according to one embodiment of the present disclosure.

FIGS. 11 to 13 are diagrams of a display illustrating a process for configuring a switch, for example, setting step for transmitting a command for the device selected in a list searched based on the Join Enable. A selection of a Network Setting object 1330 initiates manual network setting. A selection of the Join Enable button 1020 transmits a message to a corresponding device. Here, the Join Enable message may be unicast to a particular device, for example.

The Network Setting is categorized into two types. One of the types automatically performs network setting (Network Setting (auto) 1320) of the switch and the other one performs network setting of the switch manually (Network Setting 1330).

For example, PS ZigBee Member Setting may be deactivated at a switch tab and On/Off objects 1350 and 1360 controls a light emitting apparatus of a switch which will be commissioned to blink. In addition, Update object 1370 may be deactivated in the switch tab and Leave may transmit a Leave command. A list searched by the Join Enable object 1020 and joined to the commissioning tool may be deleted together.

When one of the blinking switch icons 1210 is selected (FIG. 12) and on/off object 1350/1360 is selected (FIG. 13), a corresponding light emitting unit may blink according to a predetermined pattern or frequency such that a corresponding switch may be visually identified to confirm existence of the switch which is being commissioned.

FIGS. 14 to 17 are diagrams of a display illustrating a process for configuring a switch according to one embodiment of the present disclosure. The display screens of FIGS. 14 to 17 may be implemented when the Network Setting object 1330 is selected.

Figure 15:
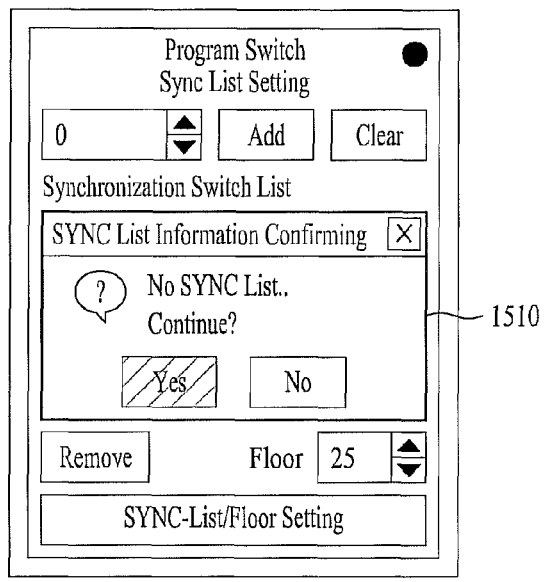
Figure 16:
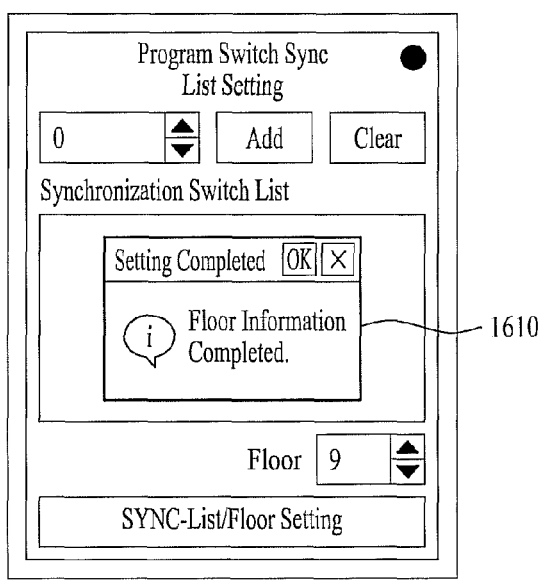

If the Network Setting object 1330 is selected in the menu 1300, as shown in FIG. 13, a program switch synchronization setting screen 1400 may be displayed. Here, in the program switch synchronization list setting screen 1400, if Sync-List/Floor Setting button 1410 is selected, for example, a pop-up window 1510 (UI) may be displayed to notify that a SYNC List is not available, as shown in FIG. 15. At this time, no switch from the list in FIG. 14 will be synchronized, for example. If the user selects 'Yes' from the pop-up window 1510, a setting completion screen UI 1610 may be displayed, as shown in FIG. 16.

FIGS. 17 to 21 are diagrams of a display illustrating a process for switch group setting configuration according to an embodiment of the present disclosure. Here, a switch group setting screen 1700 may be displayed after the floor information setting is finished in FIG. 16.

Figure 17:
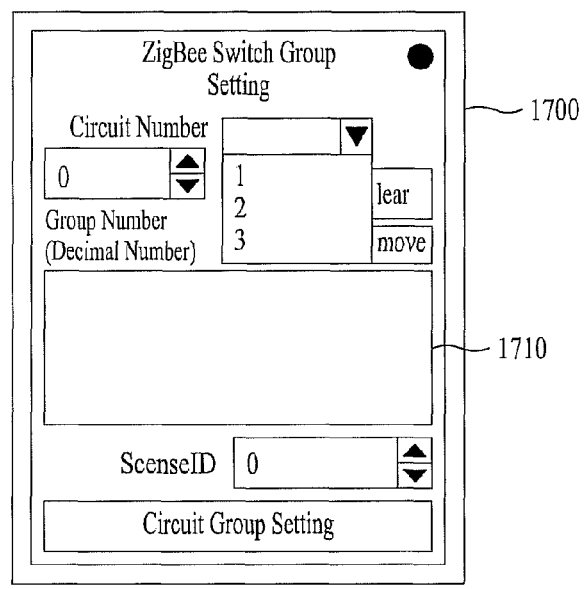
FIGS. 17 to 21 are diagrams of a display illustrating a process for switch group setting configuration according to an embodiment of the present disclosure.
Figure 18:
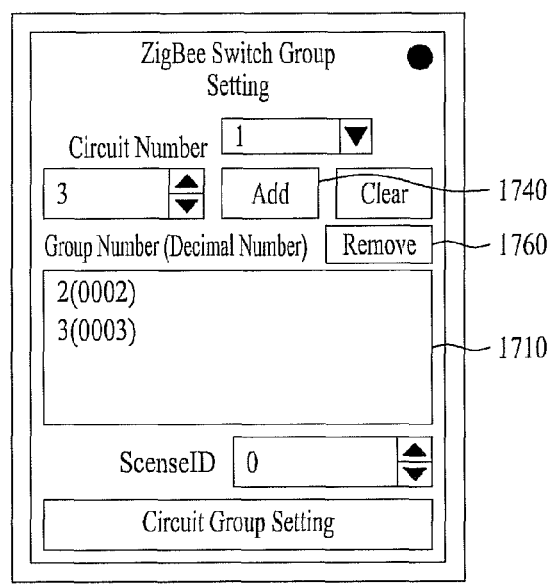
Figure 19:
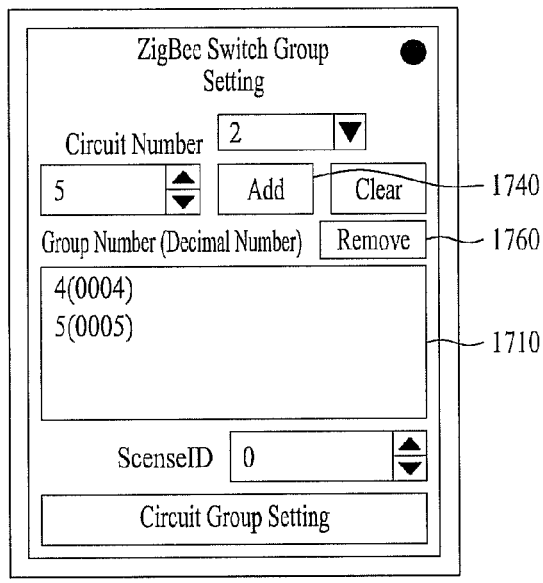

FIG. 17 illustrates a selection of a number of each of circuits which will be grouped. FIGS. 18 and 19 illustrate that group members which will be grouped from the circuits listed in the list box 1710 are selected or deleted, for example. An ADD object 1740 selects a number from a list box underneath to synchronize the number with a switch which will be commissioned currently. A Remove object 1760 removes lists located in the list box 1710 to cancel synchronization. The layer information item selects layer information of the switch which will be commissioned currently from the list box. When the synchronization is finished, SYNC-List/Layer information setting object finishes network synchronization information input for the program switch by selecting a corresponding item to provide a group setting step which is the next step.

Figure 20:
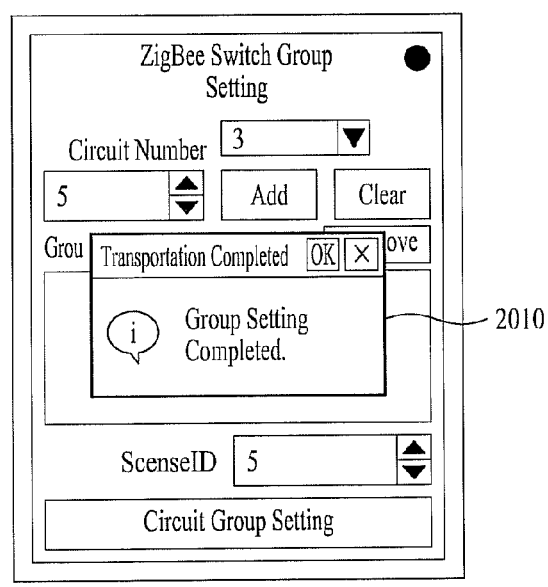
Figure 21:
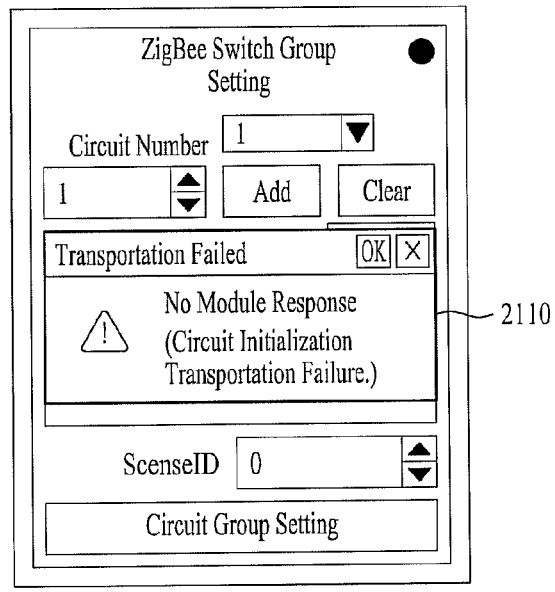

When a group setting item for each of the circuits is selected finally, pre-selected circuits is set as a single group. FIG. 20 illustrates a setting completion UI 2010 according to success in the group setting and FIG. 21 illustrates UI 2110 of setting failure according to group setting failure. A reason of the failure shown in FIG. 21 is that circuit initialization transmission is failed because of no response from a module of each circuit.

Next, the ZigBee network setting process will be described. FIG. 22 to FIG. 26 are diagrams of a display illustrating a process for a network setting configuration according to an embodiment of the present disclosure. To configure the ZigBee network according to the present disclosure, input of following items is required. Each of the items will be described as follows.

Figure 22:
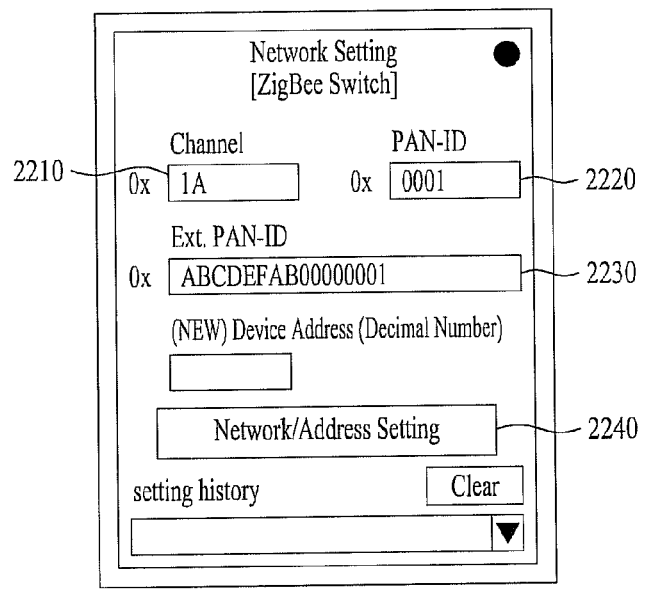
FIGS. 22 to 26 are diagrams of a display illustrating a process for a network setting configuration according to an embodiment of the present disclosure.

A Channel item 2210 selects a specific channel from a predetermined range of useable channel information. For example, FIG. 22 illustrates that an 'Ox1A' channel is selected from a range of OxOB through OX1A. A PAN ID item 2220 is provided to input an ID used to identify a corresponding PAN in a ZigBee network. For example, a specific PAN ID out of PAN IDs having a range of '0x0000' through '0Xffff' may be input in the PAN ID item 2220, as shown FIG. 22. An extended PAN ID may be input in Ext. PAN-ID item 2230. A preset value may be input in the Extended PAN ID item 2230 for security.

An address of a desired device may be input in a Device Address item 2240. As the address is input, the extra ZigBee devices having a different set channel and PAN ID from the value set based on the above input may be prevented from joining. In addition, definition relating to each of the items shown in FIG. 22 is referenced to as the definition of each of the channels, PAN ID, Extended PAN ID mentioned above.

Figure 23:
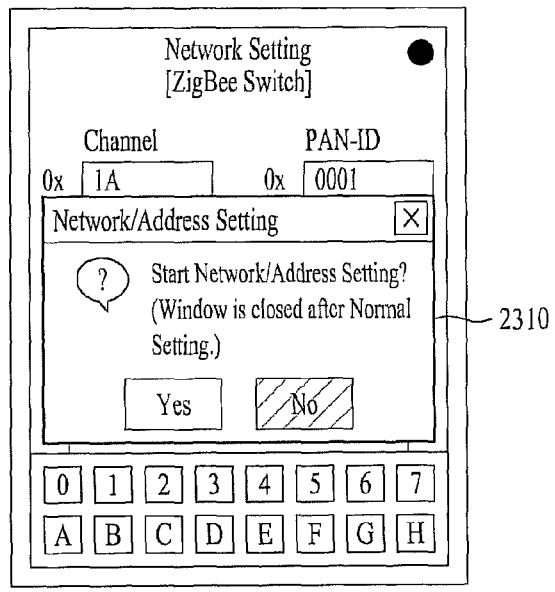
Figure 24:
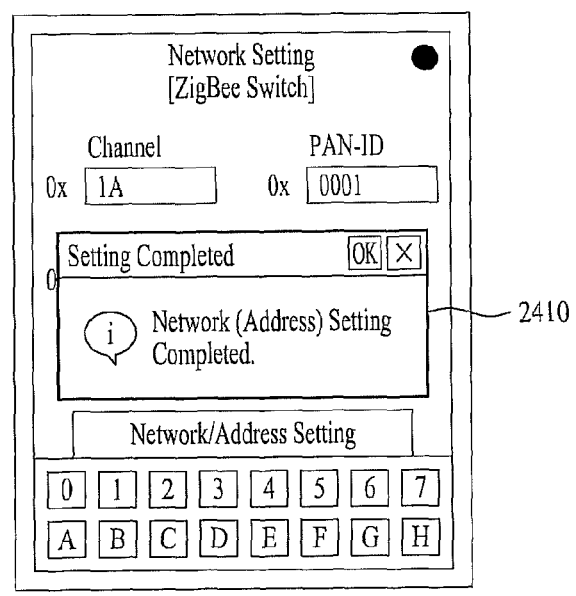
Figure 25:
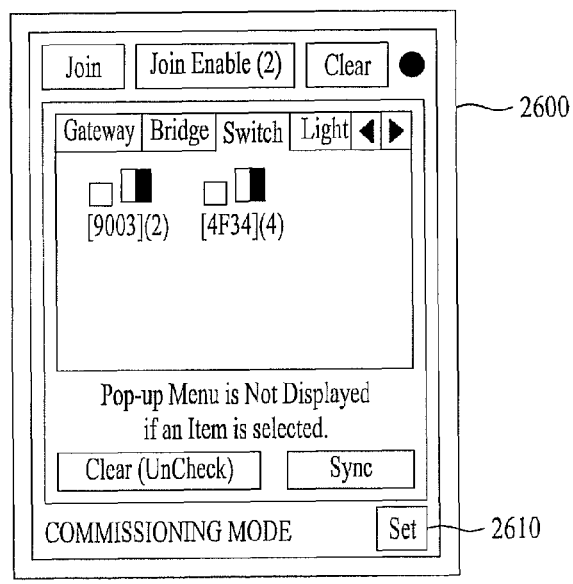

Referring to FIG. 23, the ZigBee network for a program switch may then be set. First of all, a network/address setting button 2240 is selected and a pop-up window 2310 may be displayed, as shown in FIG. 23. Here, if 'Yes' is selected, a network setting completion pop-up window 2410 may be displayed, as shown in FIG. 24. After that, a screen 2500 before the network setting completion, as shown in FIG. 25, is converted into a screen 2600 as shown in FIG. 26.

Figure 26:
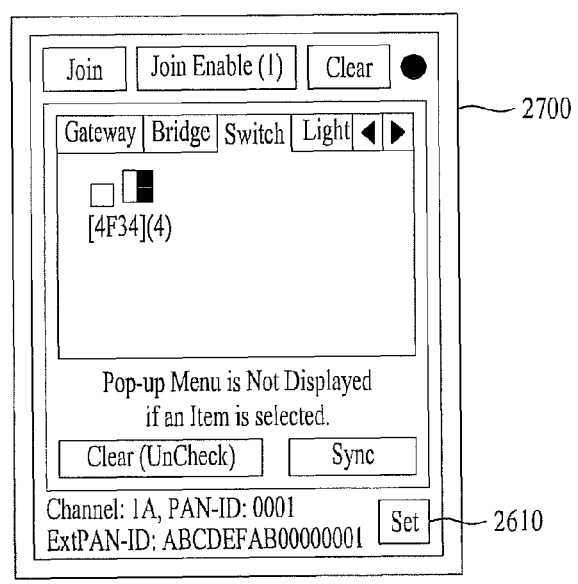

At this time, when the ZigBee network setting succeeds, a switch notifies the setting success by single blink and an icon of the switch of which the setting and registration is finished as shown in FIG. 26 may disappear from the display. In contrast, if the setting fails, the switch may blink at a prescribed pattern to alert of the failure (e.g., four times and each of the blinks may be performed at 7 second intervals). A pop-up window displaying 'network setting failure' may be displayed and the icon corresponding to the switch may continue to be displayed.

The frequency and interval of the blinks which are used for the switch confirming may be set according to a different method. In the latter case, an icon of an unregistered switch is re-selected and the above process may be re-performed for a corresponding switch.

FIGS. 27 to 30 are diagrams of a display illustrating a process for switch synchronization according to an embodiment of the present disclosure. The displays illustrate a selection of the Set button 2610 of FIG. 26 to select switches desired to be synchronized, to transmit synchronization information. As follows, the synchronization setting process will be described with reference to FIGS. 27 to 30.

Figure 27:
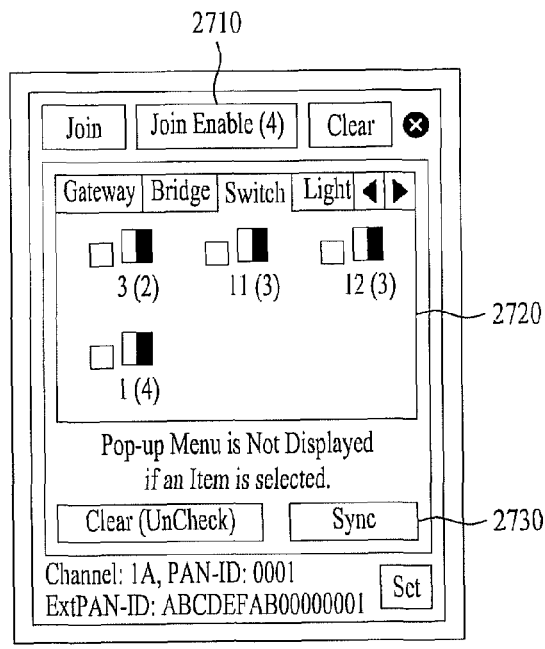
FIGS. 27 to 30 are diagrams of a display illustrating a process for switch synchronization according to an embodiment of the present disclosure.

In FIG. 27, the Join Enable object 2710 may be converted into a Search object. If the Search item is selected, an address of a switch which has the network address value as set in FIGS. 23 through 26 may be searched. After that, a switch to be synchronized is selected on the window 2720 and the Sync button 2730 is selected. Then, a pop-up window 2810 may be displayed, as shown in FIG. 28.

Figure 28:
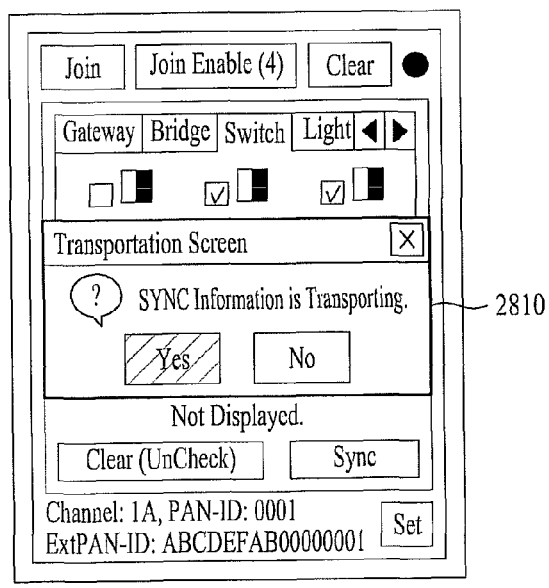
Figure 29:
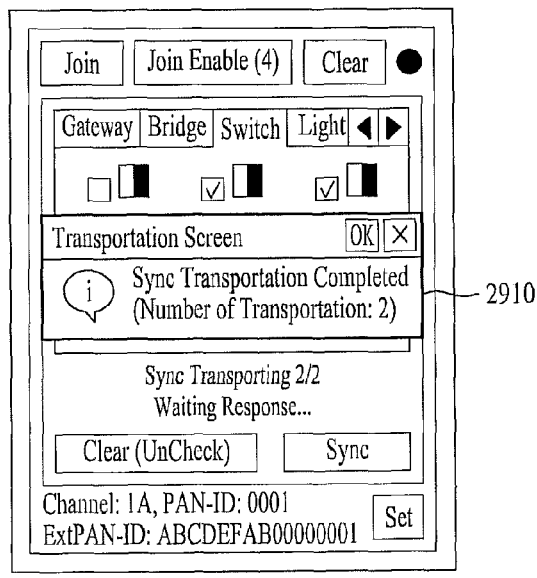

If the button 'Yes' is selected from the pop-up window 2810, as illustrated in FIG. 28, and the selected switches may receive synchronization transmit messages successfully. Then, a synchronization transmission completion pop-up window 2910 may be displayed, shown in FIG. 29. Otherwise, a synchronization transmission failure pop-up window 3010 may be displayed, as shown in FIG. 30.

Figure 30:
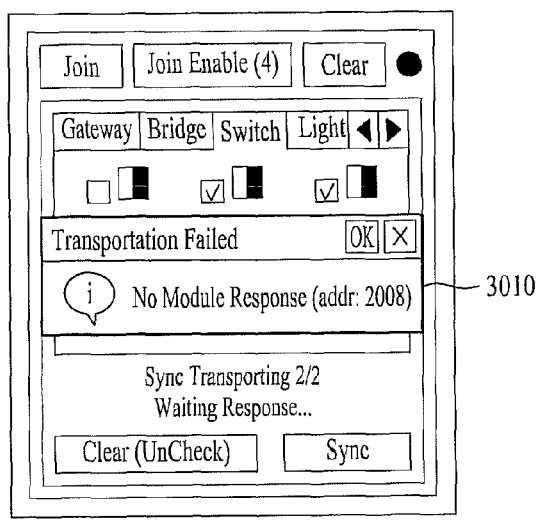
Figure 31:
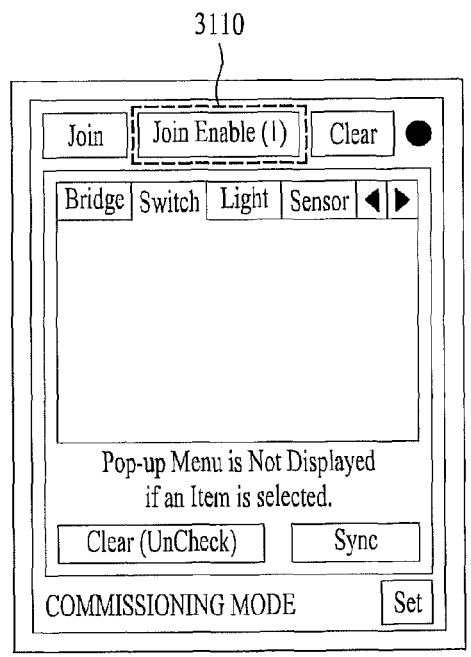
FIGS. 31 to 38 are diagrams of a display illustrating a fast starting process according to an embodiment of the present disclosure.
Figure 32:
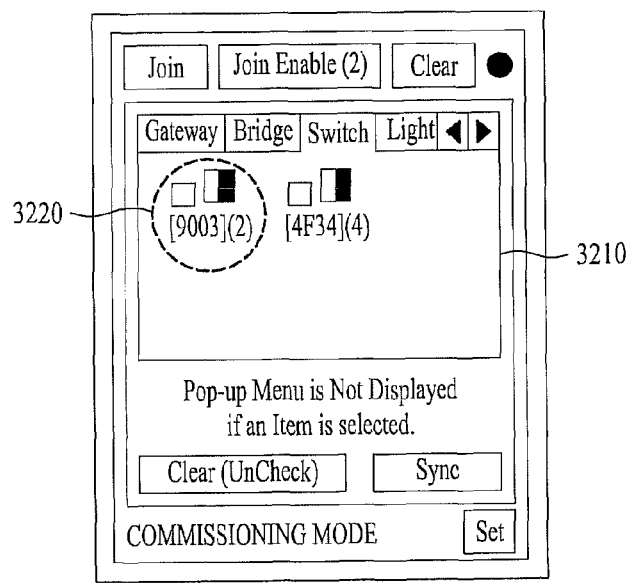

FIG. 30 may illustrate a situation where at least one switch is in sleep mode or failed to be transmitted because of problems such as a battery problem. As shown in FIG. 30, a pop-up window 3010 displaying a No Module Response message indicating synchronization transmission failure may be displayed and information (e.g., an address) of the module having no response may be displayed.

FIGS. 31 to 38 are diagrams of a display illustrating a quick start process according to an embodiment of the present disclosure. The display screens as shown illustrate steps which are performed sequentially for quick setting.

To display an indicator which is used to confirm lighting devices (e.g., visual inspection), a state of the on/off switch may be toggled and an entire light emitting apparatus may blink in case of the dimming switch. Moreover, to reset a switch of each program setting, prescribed buttons of circuits are pushed for a predetermined time period or more to reset switches of the program settings. In case of a dimming switch, a dimming down button and a dimming up button may be pushed simultaneously for a predetermined time period to reset the program switches. In a factory initialization state, it may be confirmed whether toggle is performed thirty times in 100 ms units, for example.

As follows, the quick start process will be described sequentially in reference to FIGS. 31 to 38. In reference to a screen shown in FIG. 13, the Join-Enable item may be selected from the commissioning tool to search for a switch to be installed. In reference to a screen shown in FIG. 32, the user may confirm whether an icon of the searched switch is displayed in a window 3210 in a display of the commissioning tool. At this time, the user may visually confirm whether a switch is blinking. For example, when the switch is blinking constantly, it can be confirmed that the corresponding switch is not joined to the commissioning tool yet. In this case, the corresponding switch is not displayed under the switch tab.

Figure 33:
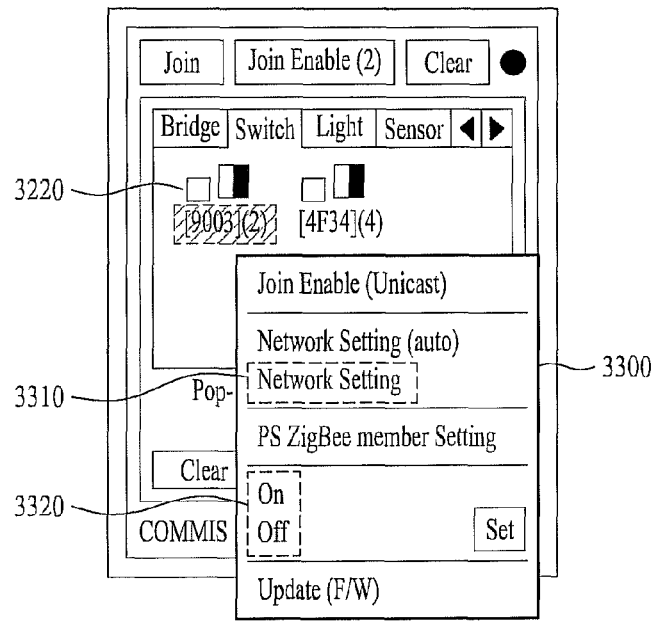

In reference to a screen shown in FIG. 33, the user selects a switch icon 3220 from the commissioning tool and selects the on/off object 3320 to search a switch being commissioned among the plurality of switches. One of the switches which quickly blinks seven times, for example, may be identified as the switch which will be commissioned.

Figure 34:
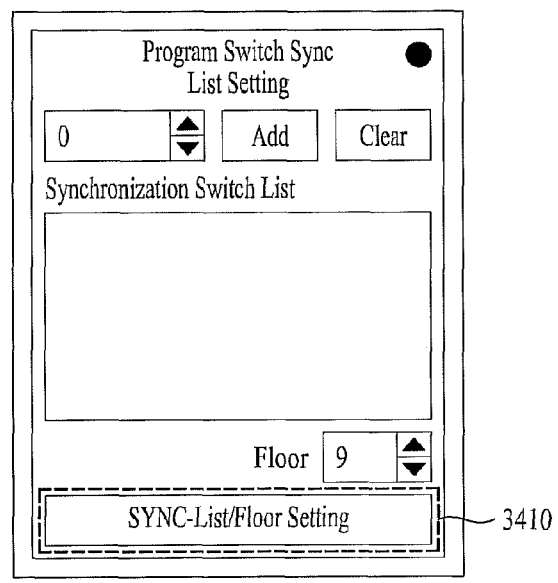

Hence, the Network Setting object 3310 may be selected from the menu 3300, as shown in FIG. 33, and the SYNC-List/Floor Setting button 3410 may be selected from a screen as shown in FIG. 34. Here, a setting completion message, namely, a layer/floor information completion message may be displayed to be converted into a program switch button setting mode capable of constructing circuits of the switches.

Figure 35:
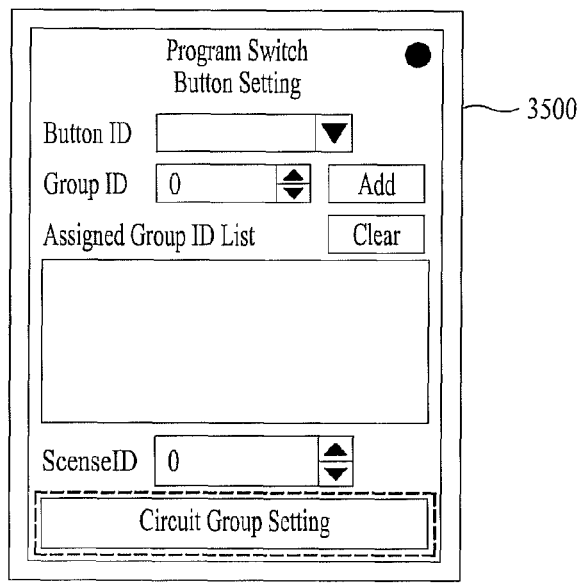
Figure 36:
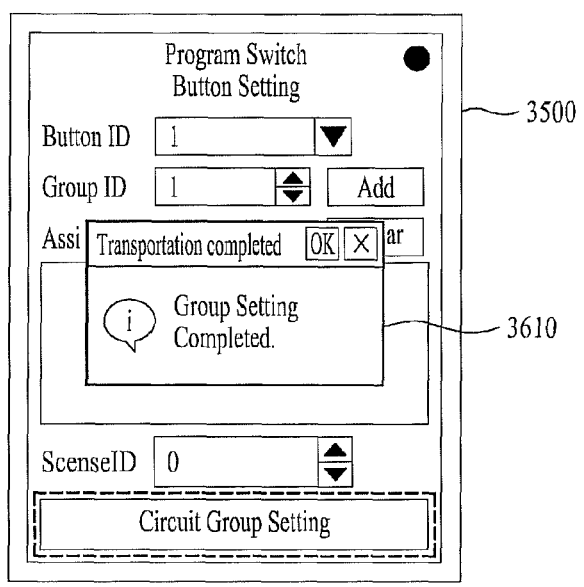

Information between each button and each group of the switches is input from a circuit configuration screen 3500 (Program Switch Button Setting screen), as shown in FIGS. 35 and 36, to select a group setting item for each circuit. If a transmission completion message, namely, a group setting completion message 3610 is set to display, the screen is switched into the network setting screen, namely, a ZigBee switch screen 3700, as shown in FIG. 37.

Figure 37:
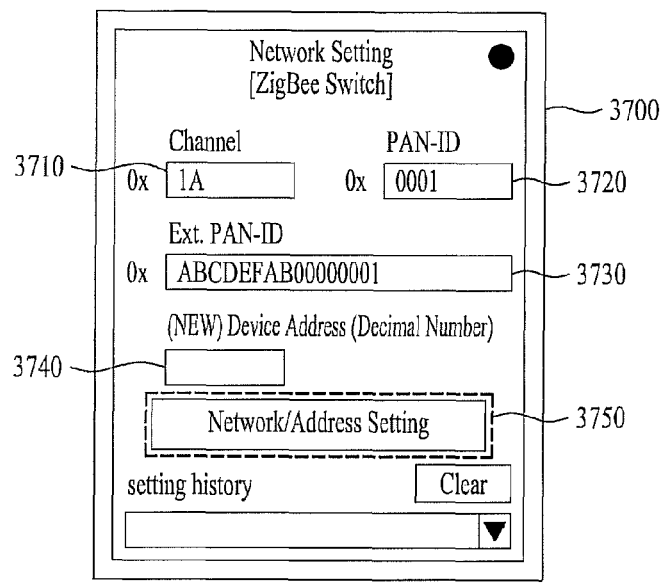

Group setting, namely, ZigBee network setting is performed from the circuit configuration shown in FIG. 37. A ZigBee setting value may be set by the commissioning tool. In this case, input information may be the Channel information 3710, the PAN ID information 3720, the Ext. PAN ID information 3730, and the device address information 3740. After inputting the ZigBee setting value as mentioned above, the network/address setting button 3750 may be selected in the commissioning tool.

Figure 38:
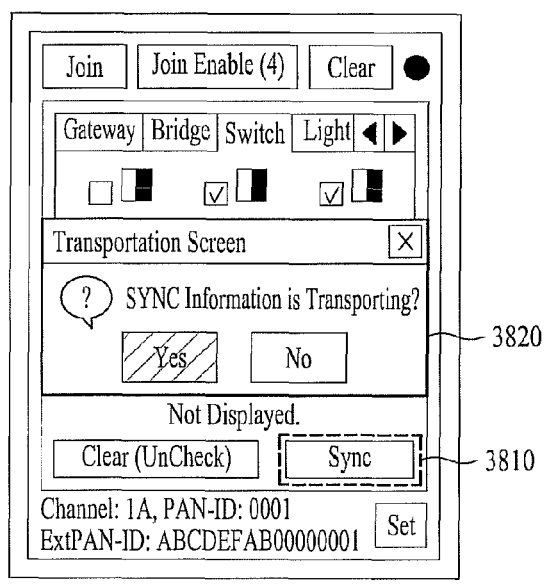

Synchronization is performed, as illustrated in FIG. 38. For example, after a switch that is supposed to be synchronized is selected, a synchronization button 3810 may be selected. A synchronization transmission completion message 3820 may be displayed and the synchronization setting is finished.

According to the present disclosure, an address for a lighting device may be automatically assigned, without overlapping or conflicting with addresses of other lighting devices provided in the lighting system implemented in a ZigBee network environment. The lighting system according to the present disclosure may control the lighting device(s) having the set address(es) in group units or independent units. Therefore, security and stability of the lighting devices provided in the lighting system may be improved through the address setting process.

As broadly described and embodied herein, a lighting system may include a lighting device; a switch to control the lighting device; and a controller to assign an address to the lighting device and the switch, the controller connected to the lighting device and the switch over a ZigBee network, wherein the lighting device and the switch have a first address and a first network identifier, the lighting device or the switch transmits a request for address assignment to the controller based on the first address, the request including the first network identifier, and the controller compares the first network identifier to a second network identifier stored at the controller, and assigns a second address based on the request if the first network identifier is the same as the second network identifier.

The lighting system may include a gateway connected between the controller and the lighting device or the switch to relay data, and configured to format data packets for the controller and the lighting device or the switch. The lighting system and the switch may be configured as slave devices and the controller may be configured as a master device. The lighting device and the switch may be ZigBee End Devices (ZED), the gateway is a ZigBee Router (ZR), and the controller may be a ZigBee Coordinator (ZC).

The first network identifier may be a first Extended Personal Areal Network Identifier (EXT_PAN_ID) associated with the lighting device or the switch and the second network identifier may be a second EXT_PAN_ID associated with the controller. The request may include the first address, a default channel, and a default personal area network identifier (PAN_ID) that correspond to the lighting device and the switch. The first PAN_ID may be unique to the PAN corresponding to the lighting device or switch and the first and second EXT_PAN_IDs may be unique to the corresponding device. The controller may receive the second EXT_PAN_ID from a second lighting device connected to the PAN. Moreover, the first address may be a default address that is restricted to communication with the controller for address assignment.

The controller may include an address setting module that processes the request for address assignment, the address setting module including device address information for identifying a device type of the requesting lighting device or switch in order to assign the second address. The address setting module may transmit a port open command and a network initialization command to the lighting device and the switch to assign the second address. In response to the request, the controller may transmit a control command to control the lighting device to turn on and off at a prescribed pattern prior to assigning the second address. In response to a message from the controller to assign the second address, the lighting device or switch may generate a response to the controller to indicate a successful address assignment, an incomplete address assignment, or an error condition.

The lighting device and the switch include a memory for storing information associated with the second address. The switch may be configured to control a dimming level of the lighting device or to turn the lighting device on or off. Moreover, the controller may be at least one of a mobile phone, PDA, tablet, or PC.

In one embodiment, a lighting system may include a lighting device; a switch to control the lighting device; and a controller to assign an address to the lighting device and the switch, the controller connected to the lighting device and the switch over a ZigBee network, wherein the lighting device and the switch has a first address and a first Extended Personal Area Network Identifier (EXT_PAN_ID), the lighting device or the switch transmits a request for address assignment to the controller based on the first address, the request including the first EXT_PAN_ID, and the controller compares the first EXT_PAN_ID to a second EXT_PAN_ID stored at the controller, and assigns a second address based on the request if the first EXT_PAN_ID is the same as the second EXT_PAN_ID. The first address may be restricted to communication with the controller to request address assignment and the second address allows control of the lighting device and the switch on the PAN.

In one embodiment, a lighting system may include a lighting device; a switch to control the lighting device; a controller to assign an address to the lighting device and the switch; a gateway for relaying messages between the controller and the lighting device or switch; and a central controller to control the lighting device and the switch based on a ZigBee standard. The lighting device and the switch may include a first address, first channel information, a first personal area network identifier (PAN_ID), and a first Extended Personal Area Network Identifier (EXT_PAN_ID) and the controller includes a second EXT_PAN_ID, and wherein the lighting device or the switch transmits a request for address assignment to the controller based on the first address, the request including the first channel information, the first personal area network identifier (PAN_ID), and the first Extended Personal Area Network Identifier (EXT_PAN_ID). In response to the request, the controller may compare the first EXT_PAN_ID to the second EXT_PAN_ID stored at the controller, and assign a second address to the lighting device or switch based on the first channel information, the first personal area network identifier (PAN_ID), and the first Extended Personal Area Network Identifier (EXT_PAN_ID) if the first EXT_PAN_ID is the same as the second EXT_PAN_ID. Moreover, the first address may be limited to communicating with the controller to request address assignment and the second address allows control of the lighting device and the switch.

As embodied and broadly described herein, a lighting system may include a lighting device comprising a ZigBee communication module, a program switch comprising a ZigBee communication module, to control the lighting device and an address setting module comprising a ZigBee communication module and a commissioning tool for setting addresses to the lighting device and the program switch. The lighting device and the program switch may be connected with the address setting module at a first address and set into a second address based on a security code for authentication and security of the lighting device and the program switch by the address setting module. The lighting device may further include a gateway for ZigBee communication among the address setting module, the lighting device, and the program switch.

In one embodiment, a lighting system may include a lighting device comprising a ZigBee communication module, a program switch comprising a ZigBee communication module to control the lighting device, an address setting module comprising a ZigBee communication module and a commissioning tool for setting addresses to the lighting device and the program switch, and a controller controlling at least one of the lighting device or the program switch based on address information of the lighting device or the program switch which is received from the address setting module. The lighting device and the program switch may be connected with the address setting module at a first address and set into a second address based on a security code for authentication and security of the lighting device and the program switch by the address setting module.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
a lighting device;
a switch configured to control the lighting device; and
a controller configured to assign an address to the lighting device and the switch, the controller connected to the lighting device and the switch over a ZigBee network,
wherein the lighting device and the switch have a first address and a first network identifier,
the lighting device or the switch transmits a request for address assignment to the controller based on the first address, the request including the first network identifier, and
the controller compares the first network identifier to a second network identifier stored at the controller, and assigns a second address based on the request if the first network identifier is the same as the second network identifier.

2. The lighting system of claim 1, further comprising a gateway connected between the controller and the lighting device or the switch to relay data, and configured to format data packets for the controller and the lighting device or the switch.

3. The lighting system of claim 2, wherein the lighting device and the switch are configured as slave devices and the controller is configured as a master device.

4. The lighting system of claim 3, wherein the lighting device and the switch are ZigBee End Devices (ZED), the gateway is a ZigBee Router (ZR), and the controller is a ZigBee Coordinator (ZC).

5. The lighting system of claim 1, wherein the first network identifier is a first Extended Personal Area Network Identifier (EXT_PAN_ID) associated with the lighting device or the switch, and the second network identifier is a second EXT_PAN_ID, which corresponds to the first EXT_PAN_ID, included in the controller.

6. The lighting system of claim 5, wherein the request includes the first address, a default channel, and a default personal area network identifier (PAN_ID) that correspond to the lighting device and the switch.

7. The lighting system of claim 6, wherein the first PAN_ID is unique to the PAN corresponding to the lighting device or switch and the first and second EXT_PAN_IDs are unique to the corresponding device.

8. The lighting system of claim 5, wherein the controller receives the second EXT_PAN_ID from a second lighting device connected to the PAN.

9. The lighting system of claim 1, wherein the first address is a default address that is restricted to communication with the controller for address assignment.

10. The lighting system of claim 1, wherein the controller includes an address setting module that processes the request for address assignment, the address setting module including device address information for identifying a device type of the requesting lighting device or switch in order to assign the second address.

11. The lighting system of claim 10, wherein the address setting module transmits at least one of a port open command and a network initialization command to the lighting device and the switch to assign the second address.

12. The lighting system of claim 11, wherein, in response to the request, the controller transmits a control command to control the lighting device to turn on and off at a prescribed pattern prior to assigning the second address.

13. The lighting system of claim 12, wherein, in response to a message from the controller to assign the second address, the lighting device or switch generates a response to the controller to indicate a successful address assignment, an incomplete address assignment, or an error condition.

14. The lighting system of claim 1, wherein the lighting device and the switch includes a memory for storing information associated with the second address.

15. The lighting system of claim 1, wherein the switch is configured to control a dimming level of the lighting device or to turn the lighting device on or off.

16. The lighting system of claim 1, wherein the controller is at least one of a mobile phone, personal digital assistant, PDA, tablet, or personal computer, PC.

17. A lighting system comprising:
a lighting device;
a switch configured to control the lighting device; and
a controller configured to assign an address to the lighting device and the switch, the controller connected to the lighting device and the switch over a ZigBee network,
wherein the lighting device and the switch has a first address and a first Extended Personal Area Network Identifier (EXT_PAN_ID),
the lighting device or the switch transmits a request for address assignment to the controller based on the first address, the request including the first EXT_PAN_ID, and
the controller compares the first EXT_PAN_ID to a second EXT_PAN_ID, and assigns a second address if the first EXT_PAN_ID is the same as the second EXT_PAN_ID.

18. The lighting system of claim 17, wherein the first address is restricted to communication with the controller to request address assignment and the second address allows control of the lighting device and the switch on a personal area network, PAN.

19. A lighting system comprising:
a lighting device;
a switch configured to control the lighting device;
a first controller configured to assign an address to the lighting device and the switch;
a gateway configured to relay messages between the controller and the lighting device or switch; and
a second controller to control the lighting device and the switch based on a ZigBee standard,
wherein the lighting device and the switch includes a first address, first channel information, a first personal area network identifier (PAN_ID), and a first Extended Personal Area Network Identifier (EXT_PAN_ID) and the controller includes a second EXT_PAN_ID, and
wherein the lighting device or the switch transmits a request for address assignment to the controller based on the first address, the request including the first channel information, the first PAN_ID, and the first EXT_PAN_ID, and
in response to the request, the controller compares the first EXT_PAN_ID to the second EXT_PAN_ID, and assigns a second address to the lighting device or switch based on at least one of the first channel information, the first PAN_ID and the first EXT_PAN_ID if the first EXT_PAN_ID is the same as the second EXT_PAN_ID.

20. The lighting system of claim 19, where the first address is limited to communicating with the controller to request address assignment and the second address allows control of the lighting device and the switch.

* * * * *